(12) United States Patent
Han et al.

(10) Patent No.: US 8,363,692 B2
(45) Date of Patent: Jan. 29, 2013

(54) METHOD FOR GENERATING 2 OR MORE SEQUENCE SET, AND METHOD FOR GENERATING SEQUENCE FOR THE SAME

(75) Inventors: Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 718 days.

(21) Appl. No.: 12/525,798

(22) PCT Filed: Feb. 5, 2008

(86) PCT No.: PCT/KR2008/000751
§ 371 (c)(1),
(2), (4) Date: Aug. 4, 2009

(87) PCT Pub. No.: WO2008/097045
PCT Pub. Date: Aug. 14, 2008

(65) Prior Publication Data
US 2010/0046663 A1    Feb. 25, 2010

Related U.S. Application Data

(60) Provisional application No. 60/888,304, filed on Feb. 5, 2007, provisional application No. 60/911,240, filed on Apr. 11, 2007, provisional application No. 60/913,780, filed on Apr. 24, 2007, provisional application No. 60/915,742, filed on May 3, 2007, provisional application No. 60/916,513, filed on May 7, 2007.

(30) Foreign Application Priority Data

May 29, 2007  (KR) .................. 10-2007-0051990
Sep. 21, 2007  (KR) .................. 10-2007-0096462

(51) Int. Cl.
*H04B 1/00* (2006.01)
(52) U.S. Cl. ........................................................ 375/130
(58) Field of Classification Search ................. 375/130, 375/139, 140, 295, 354; 370/208, 209, 203, 370/350, 328, 329
See application file for complete search history.

(56) References Cited

U.S. PATENT DOCUMENTS 6,611,494 B1    8/2003  Ovalekar et al.
7,062,002 B1    6/2006  Michel et al.
(Continued)

FOREIGN PATENT DOCUMENTS

WO    WO-96/05668 A1    2/1996
WO    WO-2006/015108 A2    2/2006

OTHER PUBLICATIONS

Popovic et al. "Random Access Preambles for Evolved UTRA Cellular System",Aug. 2006, 2006 IEEE Ninth International Symposium in Spread Spectrum Techniques and Applications, pp. 488-492.*

*Primary Examiner* — David C. Payne
*Assistant Examiner* — Vineeta Panwalkar
(74) *Attorney, Agent, or Firm* — Birch, Stewart, Kolasch & Birch, LLP

(57) ABSTRACT

A method for generating a set of at least two sequences is provided. This method selects at least one sequence from each of at least two sequences based on different lengths, including first and second types of sequences, and generates a set of at least two sequences using the selected sequences. Another method selects at least one sequence from a first type of sequences and at least one sequence from a second type of sequences generated by modulating the first type of sequences using a different type of sequences, and generates the set of at least two sequences using the selected sequences. To generate sequences based on a length corresponding to available subcarriers excluding a DC subcarrier, another method generates sequences such that the sequences are continuously arranged in a region excluding the DC subcarrier using frequency-domain cyclic shift while none of the sequences is allocated to the DC subcarrier.

4 Claims, 15 Drawing Sheets

U.S. PATENT DOCUMENTS

| | | | |
|---|---|---|---|
| 2003/0021365 A1* | 1/2003 | Min et al. | 375/343 |
| 2003/0102905 A1 | 6/2003 | Ha et al. | |
| 2006/0050799 A1* | 3/2006 | Hou et al. | 375/260 |
| 2008/0013516 A1* | 1/2008 | Zhang et al. | 370/342 |
| 2008/0031186 A1* | 2/2008 | Onggosanusi et al. | 370/328 |
| 2008/0049708 A1* | 2/2008 | Khan et al. | 370/343 |

\* cited by examiner (a) Periodic (b) Aperiodic (a) Periodic (b) Aperiodic (a) Aperiodic auto-correlation (b) Aperiodic cross-correlation (a)

(b)

(a)

(b)

(a) no-shift mapping (b) 32-shift mapping (a)

(b)

(a)

(b)

(a)

(b)

(a)

(b)

(a)

(b)

METHOD FOR GENERATING 2 OR MORE SEQUENCE SET, AND METHOD FOR GENERATING SEQUENCE FOR THE SAME

This application is the National Phase of PCT/KR2008/000751 filed on Feb. 5, 2008, which claims priority under 35 U.S.C. 119(e) to U.S. Provisional Application Nos. 60/888,304 filed on Feb. 5, 2007, 60/911,240 filed on Apr. 11, 2007, 60/913,780 filed on Apr. 24, 2007, 60/915,742 filed on May 3, 2007 and 60/916,513 filed on May 7, 2007 and under 35 U.S.C. 119(a) to Patent Application Nos. 10-2007-0051990 and 10-2007-0096462 filed in Korea on May 29, 2007 and Sep. 21, 2007, all of which are hereby expressly incorporated by reference into the present application.

TECHNICAL FIELD

The present invention relates to a method for generating a set of two or more sequences that can be applied to a specific channel and a method for generating sequences for the same.

BACKGROUND ART

First, reference is made to sequences that are used in OFDM, OFDMA, and 3GPP LTE systems to which the above methods are applied.

Recently, the demand for high-speed data transmission has rapidly increased. The OFDM scheme is advantageous for high-speed transmission and thus has been adopted as a transmission scheme for a variety of high-speed communication systems. The following is a description of Orthogonal Frequency Division Multiplexing (OFDM). The basic principle of the OFDM is to divide a high-rate data stream into a large number of low-rate data streams and to simultaneously transmit the low-rate data streams through a number of carriers. Each of the carriers is called a subcarrier. Since the subcarriers of the OFDM are orthogonal to each other, it is possible for the receiving side to detect the frequency components of the subcarriers even if they overlap each other. The high-rate data stream is converted into multiple low-rate data streams through a serial-to-parallel converter. The parallel low-rate data streams produced through the conversion are multiplied by respective subcarriers and are then combined to be transmitted to the receiving side. The OFDMA is a multiple access method which allocates subcarriers in a total band in the OFDM system to multiple users according to transfer rates requested by the users.

The OFDM scheme has a problem in that the Peak-to-Average-Power Ratio (PAPR) or Cubic Metric (CM) of transmission signals is very high. Since the OFDM scheme transmits an OFDM signal in the frequency domain using multiple subcarriers through IFFT, the magnitude of the amplitude of the OFDM signal can be represented by the sum of the magnitudes of the multiple subcarriers. However, if the multiple subcarriers are in phase with each other, a signal having a high peak similar to an impulse occurs in the OFDM signal, thereby causing the OFDM signal to have a very high PAPR or CM. Such transmission signals according to the OFDM reduce the efficiency of a high-output linear amplifier and operate in a nonlinear region of the high-output linear amplifier, thereby causing signal distortion.

The following is a description of channels and sequences for use in the channels in a newly-proposed 3rd Generation Partnership Project (3GPP) Long Term Evolution (LTE) system.

Generally, in order to perform communication with a base station, a terminal (or user equipment) first carries out synchronization with the base station over a synchronization channel (SCH) and conducts a cell search. The SCH may have a hierarchy such that it is divided into a Primary Synchronization channel (P-SCH) and a Secondary Synchronization channel (S-SCH).

The cell search is a series of processes that a terminal performs to acquire the ID of a cell to which the terminal belongs. The cell search is generally classified into an initial cell search, which a terminal performs when it is powered on, and a neighbor cell search through which a terminal in a connected or idle mode searches for a neighbor base station.

It is preferable that the P-SCH used in a communication system such as OFDM or SC-FDMA, which uses multiple orthogonal subcarriers, satisfy the following requirements.

First, auto-correlation properties in the time domain for SCH sequences should be good to allow the receiving side to achieve high detection performance.

Second, the complexity due to synchronization detection should be low.

Third, the Peak-to-Average Power Ratio (PAPR) or CM should be low.

Fourth, if an SCH can be used for channel estimation, it is desirable that its frequency response have a constant value. That is, it is known that a flat response in the frequency domain exhibits the best channel estimation performance.

A type of sequence, which is under discussion for use in channels that are used in the LTE including the SCH described above, is a Zadoff-Chu sequence which is a Constant Amplitude Constant Auto-Correlation (CAZAC)-type sequence.

Two types of CAZAC sequences, which are mainly used, are Generalized Chirp-Like (GCL) CAZAC and Zadoff-Chu CAZAC sequences. The Zadoff-Chu CAZAC sequence is given as follows.

$$a^M(n) = \begin{cases} \exp(-j\pi M n^2 / L), & \text{when } L \text{ is even} \\ \exp(-j\pi M n(n+1)/L), & \text{when } L \text{ is odd,} \end{cases} \quad \text{MATHEMATICAL EXPRESSION 1}$$

where "n" denotes a sequence index, "L" denotes the length of the CAZAC sequence, and "M" denotes a sequence ID. Here, "M" can be represented by a set of natural numbers which are relatively prime to "L".

When the Zadoff-Chu (ZC) CAZAC sequence given as Mathematical Expression 1 is represented by c(k;N,M), it has the following three properties.

$$|c(k;N;M)| = 1 \quad \text{MATHEMATICAL EXPRESSION 2}$$
(for all $k$, $N$, $M$)

$$R_{MN}(d) = \begin{cases} 1, & (\text{for } d = 0) \\ 0, & (\text{for } d \neq 0) \end{cases} \quad \text{MATHEMATICAL EXPRESSION 3}$$

$$R_{M_1, M_2; N}(d) = p \quad \text{MATHEMATICAL EXPRESSION 4}$$
(for all $M_1$, $M_2$ and $N$)

Mathematical Expression 2 indicates that the magnitude of the CAZAC sequence is always 1 and Mathematical Expression 3 indicates that the auto-correlation function of the CAZAC sequence is represented by a delta function. Here, the auto-correlation is based on circular correlation. Mathematical Expression 4 indicates that the cross-correlation always has a constant value if "N" is a prime number.

In the case of CAZAC sequences, a total of L−1 sequences can be generated if the required length "L" of each sequence is a prime length. However, the number of sequences that can be generated is significantly reduced if the sequence length "L" is not a prime length. The following are methods which can be suggested to solve the problem in the case where the sequence length "L" required for a communication system is not a prime length due to the resource block length or the like.

One of the methods is a truncated sequence generation method.

FIG. 1 illustrates a method of generating sequences according to the truncated sequence generation method.

In this method, when a length "L" required in the system is not a prime length, a prime "X" greater than the length "L" is used as the length "L" in Mathematical Expression 1 to generate sequences. Thereafter, sequences with a length greater than "L" among the generated sequences are truncated to the length "L".

The truncated sequence generation method can increase the number of sequences. However, since the truncated sequence generation method truncates generated sequences, the method degrades both the auto-correlation property, which requires that the auto-correlation have a value of "1" when the delay is zero and have a value of "0" when the delay is not zero as represented in Mathematical Expression 3, and the cross-correlation property which requires that the cross-correlation always have a constant value as represented in Mathematical Expression 4. In addition, if sequences with bad correlation properties are removed, it cannot be guaranteed that the number of sequences is L−1. Truncating the generated CAZAC sequences may also degrade the low-PAPR properties of CAZAC sequences.

In One technique that has been suggested to overcome these problems, a maximum prime length "X" less than the length "L" required in the communication system is selected to generate a CAZAC sequence and padding is inserted into a portion having a length of "L−X".

FIG. 2 illustrates a method of generating sequences according to the padded sequence generation method.

According to the padded sequence generation method, if a length "L" required in the system is not a prime length, a prime "X", which is the greatest among primes less than the length "L", is used as the length "L" in Mathematical Expression 1 to generate a sequence. Thereafter, a zero padding having a length C2 corresponding to "L−X" is added to the generated sequence C1.

In this padded sequence generation method, the portion for correlation calculation of the sequence is set to the C1 portion of FIG. 2 to identify the sequence, thereby preventing the degradation of the auto-correlation and cross-correlation properties that would occur due to the truncation of generated sequences as shown in FIG. 1. However, the padded sequence generation method may also suffer from the degradation of the correlation and PAPR properties due to the zero padding C2 in consideration of the entire length of the sequence generated according to the method.

One method similar to that described with reference to FIG. 2 is a cyclic extension method. In the cyclic extension method, if the length "L" required in the system is not a prime length, a prime "X", which is the greatest among primes less than the length "L", is used as the length "L" in Mathematical Expression 1 to generate a sequence. Thereafter, a portion having a length C2 corresponding to "L−X" is copied from part of a previously generated sequence and is then added to the generated sequence C1 to generate a sequence having a length "L".

This method can reduce the degradation of the correlation and PAPR properties, compared to the zero-padded sequence generation method.

The following is a description of the case of generation of a set of two or more sequences for use in a specific channel.

Important considerations, when designing sequences in a sequence-based transport channel taking into consideration the above facts, include the Peak-to-Average Power Ratio (PAPR) or Cubic Metric (CM) properties, the (periodic and aperiodic) auto/cross-correlation properties, etc.

However, in the case where a set of two or more sequences for use in a specific channel is generated using sequences generated based on the same length or using the same type of sequences, it is difficult to satisfy all the requirements that the PAPR or CM properties, the correlation properties, etc., be better than a certain level.

DISCLOSURE

Technical Problem

An object of the present invention devised to solve the problem lies in providing a method for generating a set of two or more sequences for use in a specific channel in a communication system, whereby it is possible to generate a set of two or more sequences which has good correlation and PAPR (or CM) properties and also can reduce the amount of calculation at a receiver.

Another object of the present invention devised to solve the problem lies in providing a method for generating sequences, whereby, even when a method of generating sequences such that no sequence is allocated to a DC subcarrier in the frequency domain is used to generate sequences for use in generating a set of two or more sequences or to generate sequences to be used for a specific channel separately from the generation of the sequences for use in generating the set of two or more sequences, the generated sequences maintain the above-described correlation and PAPR (CM) properties in both the time and frequency domains.

Technical Solution

In accordance with one embodiment of the invention, the above objects of the present invention can be achieved by providing a method for generating a set of at least two sequences, the method including selecting at least one sequence from a first type of sequences and at least one sequence from a second type of sequences, the first and second types of sequences being generated based on different lengths, and generating the set of at least two sequences using the selected sequences.

Here, the first type of sequences may be generated through DC puncturing of sequences generated based on an available subcarrier length corresponding to available subcarriers including a DC subcarrier and the second type of sequences may be generated based on a length corresponding to the available subcarriers excluding the DC subcarrier such that none of the sequences is allocated to the DC subcarrier.

Specifically, the set of at least two sequences may be a set of three sets. The set of three sets may be generated by selecting one sequence from the first type of sequences and selecting two sequences' from the second type of sequences or may be generated by selecting two sequences from the first type of sequences and selecting one sequence from the second type of sequences. When two sequences are selected from the first type of sequences, the two sequences preferably constitute a conjugate symmetry pair.

Preferably, sequences selected from the second type of sequences at the step of selecting the sequences are continuously arranged in a region excluding the DC subcarrier using frequency-domain cyclic shift. The first type of sequences and the second type of sequences may be generated using ZC sequences, and the available subcarrier length including the DC subcarrier may be 64.

The step of selecting the sequences may include selecting sequences from the first type of sequences and the second type of sequences taking into consideration at least one of cross-correlation and PAPR properties.

When the first type of sequences are generated based on a length less than the available subcarrier length, and the second type of sequences are generated based on a length greater than the available subcarrier length, the generated first type of sequences may be extended to the available subcarrier length through cyclic copy or zero insertion, and the generated second type of sequences may be truncated to the available subcarrier length.

In accordance with another embodiment of the invention, the above objects of the present invention can also be achieved by providing a method for generating a set of at least two sequences, the method including selecting at least one sequence from a first type of sequences and at least one sequence from a second type of sequences generated by modulating the first type of sequences using a different type of sequences; and generating the set of at least two sequences using the selected sequences.

Here, the first type of sequences may be Zadoff-Chu (ZC) sequences, and the second type of sequences may be generated by modulating the first type of sequences using Hadamard sequences.

In another embodiment of the present invention, provided herein is a method for generating a set of at least two sequences, the method including selecting at least one sequence from each of at least two different types of sequences including first and second types of sequences; and generating the set of at least two sequences using the selected sequences.

In another embodiment of the present invention, provided herein is a method for generating sequences based on a length corresponding to available subcarriers excluding a DC subcarrier, the method including generating sequences such that the sequences are continuously arranged in a region excluding the DC subcarrier using frequency-domain cyclic shift while none of the sequences is allocated to the DC subcarrier.

Here, when each of the generated sequences has an even sequence length, the frequency-domain cyclic shift may allow the sequences to be shifted by a length corresponding to half of the sequence length. More specifically, the frequency-domain cyclic shift may allow the sequences to be shifted by a length corresponding to half of the sequence length to a right or left side in a frequency domain.

Advantageous Effects

According to the embodiments of the invention, it is possible to generate a set of two or more sequences which has good correlation and PAPR (or CM) properties and also can reduce the amount of calculation at a receiver.

MODE FOR INVENTION

Figure 1:
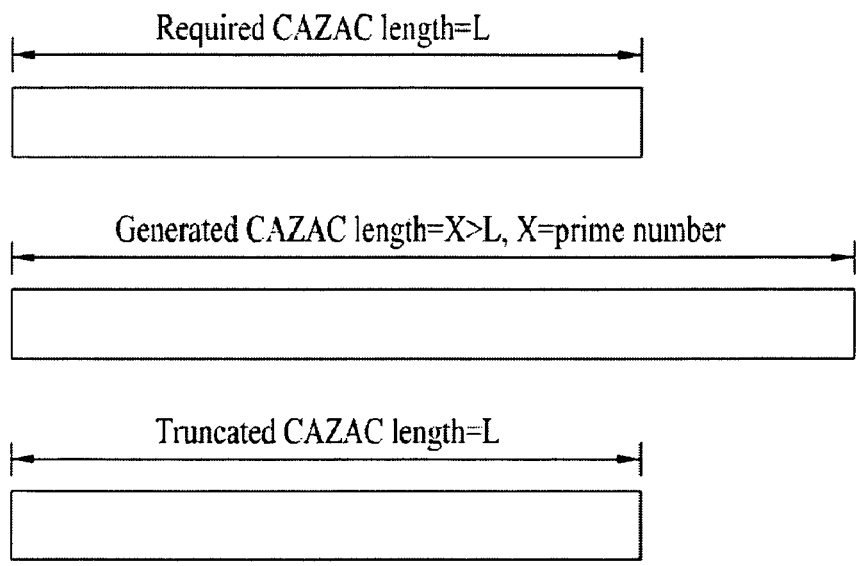
FIG. 1 illustrates a method of generating sequences according to a truncated sequence generation method.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

The invention provides a method for generating a set of three sequences, which all have excellent correlation and PAPR (CM) properties, as a set of two or more sequences for use in a specific channel as described above. The method according to the invention described below is divided into methods for generating a set of two or more sequences using two or more sequence generation methods based on different lengths according to one embodiment of the invention and methods for generating a set of two or more sequences using sequences produced through modulation based on a different type of sequences according to another embodiment of the invention.

I. First Embodiment

Method for Generating a Set of Two or More Sequences According to Two or More Sequence Generation Methods Based on Different Lengths To explain the method according to an embodiment of the invention, first, we describe methods for generating sequences (hereinafter referred to as "component sequences") which can be used to constitute the set of two or more sequences described above. Although the methods will each be described using Zadoff-Chu (ZC) sequences as an example, the methods can be applied to any other sequence. In addition, a set of any number of two or more sequences, other than three sequences, can be generated although the following description will be given focusing on the case where a set of three sequences is generated as the set of two or more sequences.

<First Method>

The first method for generating the component sequences, which is applicable to a single-subcarrier system such as WCDMA, is to generate sequences in the time domain without DC puncturing. Here, "DC puncturing" means the procedure of eliminating component of sequence located in the DC area when the sequence is mapped on the frequency domain, and not rearranging the remaining components of the sequence.

In this method, sequences generated in the time-domain are defined and transmitted in the time or frequency domain. This method is more effective when the channel for transmission is processed in the time domain. For example, in the case of a synchronization channel of the WCDMA system, a P-SCH signal generated and defined in the time domain is transmitted without change in the time domain so that the receiving side can perform correlation to achieve symbol synchronization. However, this method causes a DC offset problem since signals are transmitted in a DC carrier.

<Second Method>

The second method for generating the component sequences is to generate sequences in the time domain using DC puncturing.

In this method, a sequence generated in the time domain is defined and transmitted in the time or frequency domain by puncturing (suppressing or nullifying) a frequency domain sequence chip corresponding to a DC position. This method differs from the first method in that the DC portion is punctured. Similar to the first method, this method is more effective for a channel which is processed in the time domain. This method also solves the DC offset problem using the DC puncturing.

This method is similar to the third method described below in terms of correlation performance in the case where CAZAC-type sequences such as Zadoff-Chu sequences are used. This is because CAZAC sequences maintain CAZAC properties in both the time and frequency domains. The only difference in this case is whether the sequence type is ZC or Generalized Chirp-Like (GCL) when viewed in each domain. Both the ZC and GCL sequences maintain CAZAC properties.

According to the second method, the sequence type is ZC when viewed in the time domain and is GCL when viewed in the frequency domain. The signal properties of the time and frequency domains of all sequences generated based on the ZC can be optimized to be identical to the CAZAC properties. In addition, it is desirable that sequences be continuously mapped in order to maintain the CAZAC properties in both the time and frequency domains for all root sequence index numbers. According to the second method, it is possible to maintain the continuity of sequences when mapping them in both the time and frequency domains.

<Third Method>

The third method for generating the component sequences is to generate sequences in the frequency domain using DC puncturing.

In this method, sequences are generated and the generated sequences are mapped in the frequency domain and DC puncturing is then performed on them. This method is more effective for a channel which is processed in the frequency domain and can also solve the DC offset problem using the DC puncturing.

This method is similar to the second method described above in terms of correlation performance in the case where CAZAC-type sequences such as Zadoff-Chu sequences are used. While the sequence type is ZC when viewed in the time domain and is GCL when viewed in the frequency domain according to the second method described above, the sequence type is ZC when viewed in the frequency domain according to this method. The signal properties of the time and frequency domains of all sequences generated based on the ZC can be optimized to be identical to the CAZAC properties. It is desirable that sequences be continuously mapped in order to maintain the CAZAC properties in both the time and frequency domains for all root sequence index numbers. According to this method, it is possible to maintain the continuity of sequences when mapping them in both the time and frequency domains.

<Fourth Method>

The fourth method for generating the component sequences is to generate sequences in the frequency domain without using DC puncturing.

In this method, sequences are generated and the generated sequences are mapped in the frequency domain, taking into consideration the respective positions of a guard subcarrier and the DC region, so that the sequences are appropriately mapped avoiding the respective intervals of the guard subcarrier and the DC region. This is a method for generating signals in general OFDM systems. This method is more effective for a channel which is processed in the frequency domain and can also solve the DC offset problem, like the second and third methods.

However, although this method uses CAZAC sequences such as ZC sequences, it is not possible to maintain perfect CAZAC properties in both the domains for all sequences since discontinuity occurs in the interval of the DC subcarrier when the sequences are mapped to subcarriers. That is, this method has a problem in that not every generated sequence can be optimized to maintain CAZAC properties in both the time and frequency domains and the optimization is possible only for a specific portion mapped to the frequency domain.

Some problems occur when a set of three sequences is generated using sequences generated using the above four methods. The first method inherently has the DC offset problem, while the following problem may occur when a set of three sequences is generated using the second to fourth methods. That is, if a single generation method for one length is applied to a region for processing when defining a set of sequences for a channel to be used for a specific purpose using one of the second to fourth methods, there is a difficulty in constructing a sequence set which satisfies all the desirable properties (for example, correlation properties, PAPR or CM properties) of the channel.

For a detailed description of this problem, a detailed example is described below with reference to a P-SCH among synchronization channels of the current 3GPP LTE system. Of course, principles described below can be applied to any sequence-based channels (for example, uplink/downlink reference signals (RS), ACK/NACK, control channels, RACHs, etc.) for which the processes of transmitting and detecting sequences are basically identical. Since it is very important to select a set of sequences which satisfies the basic properties described above, the same method will be applicable to select the sequences even when detection is performed on such a sequence-based channel in a different manner from the correlation detection.

In the case of a P-SCH that has been considered up to now in the 3GPP LTE system, mapping is performed within 73 subcarriers (1.095 MHz) including the central band (including the DC subcarrier), regardless of the transport bands (for example, 1.25 MHz, 2.5 MHz, 5 MHz, 10 MHz, 15 MHz, 20 MHz, etc.) of a base station (or Node B). Thus, the number of actually available subcarriers is 72 when the DC subcarrier is taken into consideration. Accordingly, the number of subcarriers occupied by the P-SCH can be less than or equal to 72.

Here, it is desirable that all the 72 subcarriers be used simply in terms of utilization of resources when the number of subcarriers or the sequence length used is considered. However, the use of the 72 subcarriers indicates the use of a total of 73 subcarriers including the DC subcarrier. Here, a re-sampling process corresponding to a multiple of 1.095 MHz (i.e., 1.095x MHz) is required to carry out correlation calculation with high performance and a small amount of calculation when symbol synchronization is performed. This requires the complexity of having to use an additional interpolator or decimator for the re-sampling of 1.095x MHz since the sampling clock used when transmitting an OFDM symbol in the LTE is a multiple of 1.92 Mz. However, if a sampling clock (for example, 0.96 or 0.48 MHz) obtained by dividing 1.92 MHz by a natural number is used, it is possible to reuse the existing sampling clock so that it is only necessary to perform decimation at regular intervals without having to use the interpolator.

Accordingly, although the following description will be given of the case where 0.96 Mz is used, i.e., where 64 subcarriers including the DC subcarrier are used as available subcarriers, the methods described below can be applied to any other case, for example, where the available subcarriers are 72 subcarriers (1.08 MHz), 71 subcarriers (1.065 MHz), or 73 subcarriers (1.095 MHz).

The following description will be given with reference to ZC sequences since ZC sequences are currently used in the P-SCH of the 3GPP LTE. This is because ZC sequences maintain excellent correlation and PAPR (CM) properties and excellent flat properties in the time and frequency domains.

Sequence-based channels require good correlation properties as described above. When amplification for transmission is considered, the PAPR problem is also important for sequence-based channels due to the distortion problem in the nonlinear region of an amplifier. The PAPR is directly related to the flatness of signals in the time domain. Finally, the frequency flatness is a requirement when the sequence is used for channel estimation in the frequency domain. That is, the frequency flatness should also be taken into consideration since it is considered in the current LTE that channel estimation is performed in the P-SCH to carry out correlation detection of the S-SCH.

Reference will now be made in detail to the respective cases where a set of three sequences is generated using the first to fourth methods described above. Problems occurring in such cases will also be described in the following description. The second and third methods will be described focusing on the case where sequences are generated based on a length of 64, and will also be described for sequences of a different length from 64 as needed. Since the second and third methods and the fourth method are based on lengths which differ by a length corresponding to the DC subcarrier, it can be seen that the length of each sequence generated according to the second and third methods will be different from that of the fourth method.

In consideration of these facts, reference will now be made to the cases where a set of three sequences is generated based on each of the methods.

<The Case of Generation of Set of Three Sequences Using First Method>

If a set of three sequences is generated using sequences generated according to this method, each sequence of the generated sequence set inherently has the DC offset problem as described above. Therefore, this case is not suitable.

<The Case of Generation of Set of Three Sequences Using Second Method>

A sequence $P^M(n)$ defined in the time domain according to this method can be represented as follows.

$$P^M(n) = \sqrt{\frac{N}{\sum_{n=0}^{N-1} |d^M(n)|^2}} \, a^M(n) \quad \text{MATHEMATICAL EXPRESSION 5}$$

-continued where $$d^M(n) = a^M(n) - \frac{1}{\sqrt{N}} \sum_{n=0}^{N-1} a^M(n),$$

$$n = 0, 1, 2, \ldots, N-1$$

Here, "n" denotes a time domain index.

On the other hand, a sequence $P^M(k)$ defined in the frequency domain according to this method can be represented as follows.

$$P^M(k) = \qquad \text{MATHEMATICAL EXPRESSION 6}$$

$$\begin{cases} \sqrt{\dfrac{N}{\sum_{n=0}^{N-1} |D^M(n)|^2}} D^M(k), & k = \begin{bmatrix} -\text{floor}\left(\dfrac{N}{2}\right), \ldots, -1 \\ 1, \ldots, \left(N - \text{floor}\left(\dfrac{N}{2}\right)\right) - 1 \end{bmatrix} \\ 0, & k = 0 \end{cases}$$

where $$D^M(k) = \frac{1}{\sqrt{N}} \sum_{n=0}^{N-1} a^M(n) e^{-j2\pi kn/N}$$

Here, "k" denotes a frequency domain index.

When Mathematical Expression 6 is compared with Mathematical Expression 5, it can be seen that time-domain sequences and frequency-domain sequences generated according to this method differ only in their transmission domains and are essentially the same signals.

In this case, it can also be seen that sequences generated according to this method are ZC sequences when viewed in the time domain and are GCL sequences when viewed in the frequency domain as described above.

Here, GCL sequences are defined by an equation obtained by multiplying ZC sequences by DFT coefficients.

Reference will now be made to an example according to this method wherein sequences are generated based on N=64 and L=64 and are then mapped and transmitted in the frequency domain.

The number of possible types of ZC sequences of the length 64 is 32. The periodic properties of all the 32 sequences are maintained at the CAZAC properties. That is, the 32 sequences almost uniformly maintain their properties in the auto/cross-correlation and PAPR aspects although DC puncturing has been performed. However, the 32 sequences do not uniformly maintain the auto/cross-correlation and PAPR/CM (in the case of 4× oversampling) properties in the aperiodic aspect. Not only the periodic correlation properties but also the aperiodic properties are very important, especially for synchronization channels, since the synchronization channels require symbol synchronization, while both the properties are still important for other channels.

An example where three ZC sequences of M=(1, 3, 63) are selected to generate a set of three sequences will be described below as a detailed example of the method for generating a set of three sequences wherein sequences are generated based on N=64 and L=64 and are then mapped and transmitted in the frequency domain as described above.

When two or more ZC sequences are selected, it is desirable that a conjugate symmetry pair be selected in order to support simultaneous correlation. Here, "the conjugate symmetry pair" means two sequences one of which is complex conjugate form of the other one. For example, when it comes to ZC sequence, this means that a pair of sequences of M=(1, 63), (3, 61), (5, 59), (7, 57), . . . , (31, 33) is selected in the case where sequences are generated based on N=64, a pair of sequences of M=(1, 70), (2, 69), (3, 68), . . . , (35, 36) is selected in the case of N=71, and a pair of sequences of M=(1, 62), (2, 61), (4, 59), . . . , (31, 32) is selected in the case of N=63. Accordingly, a preferred embodiment of the invention suggests that, when a set of two or more sequences is selected, a conjugate symmetry pair be selected as two sequences of the sequence set in order to allow simultaneous correlation.

FIGS. 3A and 3B and 4A and 4B are graphs illustrating auto-correlation properties and cross-correlation properties in the case where three sequences having ZC sequence indices of M=(1, 3, 63) are selected as a detailed example of the generation of a set of three ZC sequences based on N=64 and L=64 according to the second method.

As can be seen from FIGS. 3A and 3B and 4A and 4B, the selection of sequences of M=(1, 3, 63) does not satisfy the requirement that the periodic/aperiodic auto/cross-correlation properties be optimized.

Figure 4:
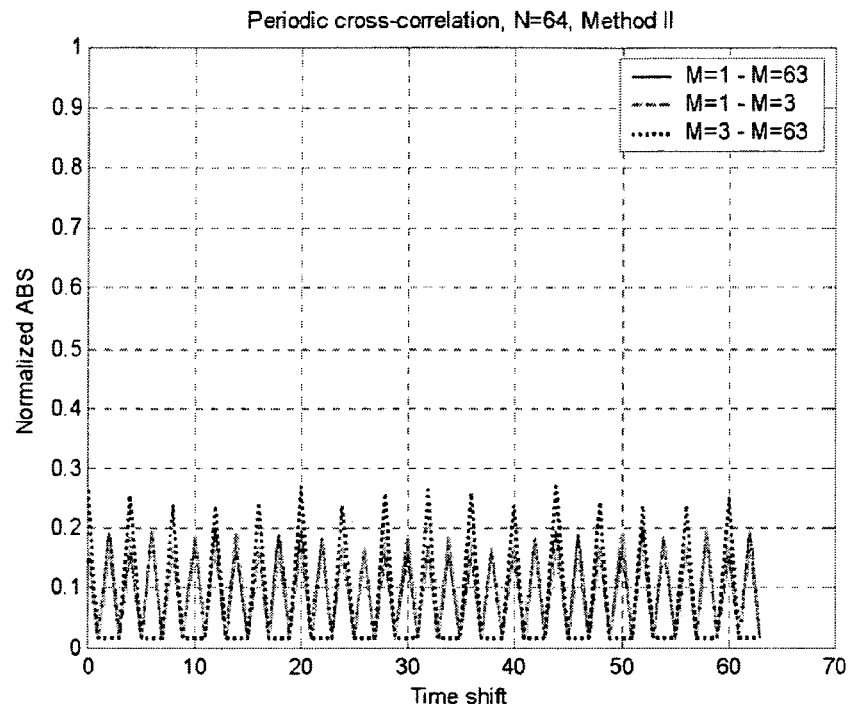
Figure 4:
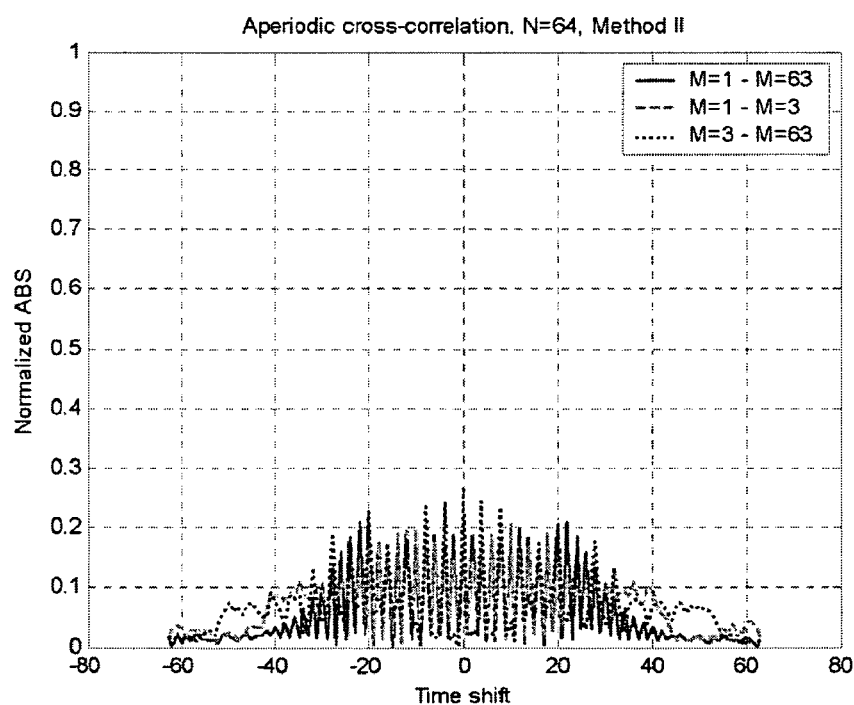

Specifically, the aperiodic auto-correlation properties can be satisfied by selecting another root sequence. That is, large side lobes of the auto-correlation properties in the case of M=3 in FIG. 3 can be overcome by selecting another sequence set. However, when any set of three sequences is generated, optimization is not possible in the cross-correlation aspect if the set of three sequences is generated using ZC sequences having an even length since correlation peaks higher than 24% occur as shown in FIG. 4.

For reference, when the above requirements are considered, it is preferable that two of the set of three sequences be selected such that the two sequences constitute a conjugate symmetry pair satisfying simultaneous correlation and the remaining one be selected in consideration of another requirement such as aperiodic correlation, PAPR, or CM. It should be noted that the requirement of the combination of M=(1,63) is applied when only the second method is used.

In the case where only the second method is used, M=(1, 19,63) can be selected as an optimal set if the PAPR or CM is not considered when N=64. However, in this case, M=19 is not suitable since the CM when M=19 is 4.2103 dB (where it is assumed that a set of root sequence indices with a CM of less than 2.6 dB should be selected as the optimal set). In this case, the cross-correlation also has a high peak value of about 25%.

Thus, a set of M=(1,51,63) can be set as the optimal set taking into consideration the PAPR, CM, and correlation properties. In this case, respective non-oversampled PAPRs of the sequences are 1.0904 dB, 1.0821 dB, and 1.0904 dB and respective 4× oversampled CMs thereof are 1.3713 dB, 2.521 dB, and 1.3713 dB.

Figure 5:
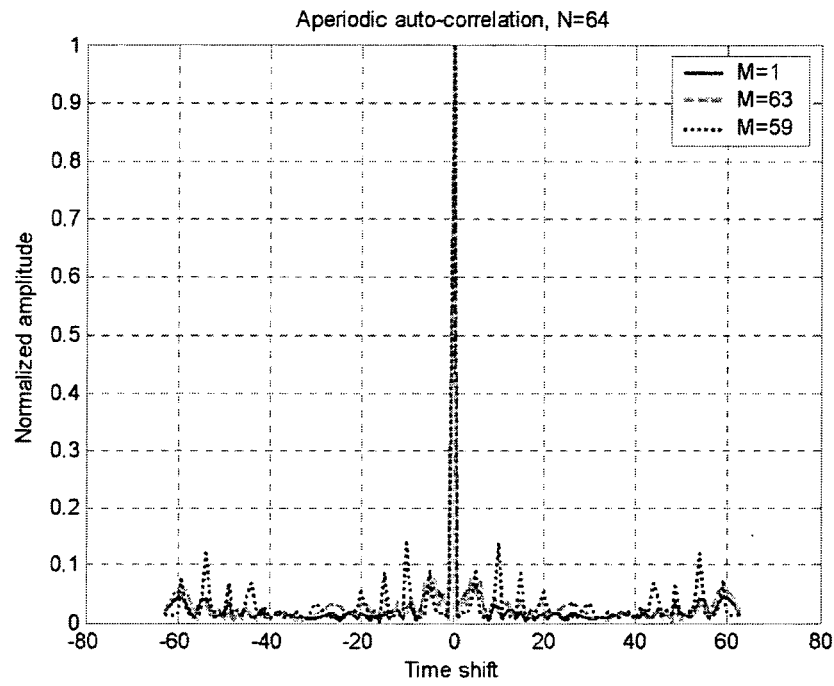
FIGS. 5A and 5B are graphs illustrating aperiodic auto-correlation and cross-correlation properties of the set of three sequences of $M=(1,51,63)$ among the sequences generated according to the second method.
Figure 5:
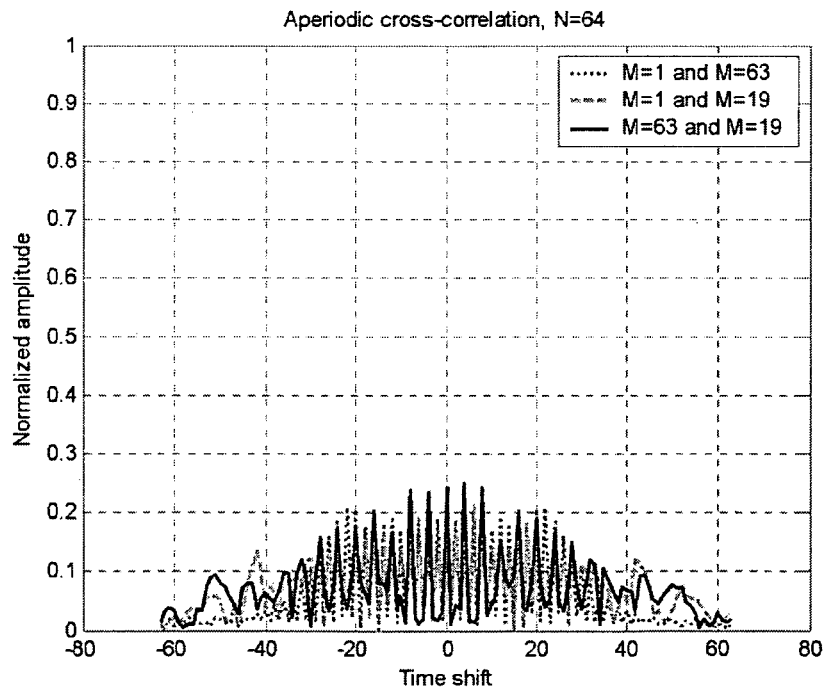

FIGS. 5A and 5B are graphs illustrating aperiodic auto-correlation and cross-correlation properties of the set of three sequences of M=(1, 51, 63) among the sequences generated according to the second method.

It can be seen from FIGS. 5A and 5B that even the cross-correlation of the selected optimal set of M=(1,51,63) exhibits a peak value of about 25.4%.

In the case where the second method is used, the same optimal set of M=(1,51,63) as described above is selected even when the PAPR or CM requirement is ignored.

For reference, in the case where signals are transmitted according to the above Mathematical Expression 5, the signals can be transmitted through a Digital to Analog Converter (DAC) in the time domain and the pulse shaping filter and oversampling can be selectively applied. In the case where signals are transmitted according to the above Mathematical Expression 6, signals mapped as expressed in Mathematical Expression 6 can be transmitted in the frequency domain according to an IFFT OFDM modulation method in consideration of data and guard subcarriers. The receiving side may perform the same operations for both the methods.

It may be preferable that sequences of a length corresponding to the average number of subcarriers be used in the best case (for example, where there is no problem with the re-sampling rate) among the cases according to the second method. This corresponds to the case of N=73 in the example described above. In this case, a set of M=(1,67,72) can be selected as the optimal set.

FIGS. 6A and 6B are graphs illustrating aperiodic auto-correlation and cross-correlation properties in the case where a set of three sequences of M=(1,67,72) is selected in the case of N=73 when sequences are generated according to the second method.

It can be seen from FIGS. 6A and 6B that respective non-oversampled PAPRs of the three sequences in this case are 1.0205 dB, 1.0205 dB, and 1.0205 dB, respective 4× oversampled raw CMs thereof are 1.183 dB, 1.183 dB, and 2.1862 dB, and their highest cross-correlation value is about 19%.

<The Case of Generation of Set of Three Sequences Using Third Method>

Reference will now be made to an example of application of the third method described above where sequences are generated based on N=64 and L=64 and are then mapped and transmitted in the frequency domain, similar to the example of the second method described above. This method is similar to the second method in terms of performance and differs from the second method only in that the sequence type is GCL when viewed in the time domain as described above. The same facts or principles as described above in the case where only the second method is used can be applied to this method. Accordingly, similar to the second method, the third method has a problem that the cross-correlation properties cannot be optimized.

When this method is used, it is also preferable that a pair of sequences which satisfies the simultaneous correlation requirement be selected as two sequences of the set of three sequences and the remaining one be selected in consideration of another requirement such as aperiodic correlation, PAPR, or CM.

A sequence set of M=(1,59,63) can be selected as an optimal set in the case where only the third method is used to generate a set of three sequences. Respective non-oversampled PAPRs of the sequences in this case are 1.0904 dB, 1.0821 dB, and 1.0904 dB and respective 4× oversampled (raw) CMs thereof are 1.3713 dB, 2.521 dB, and 1.3713 dB.

Figure 7:
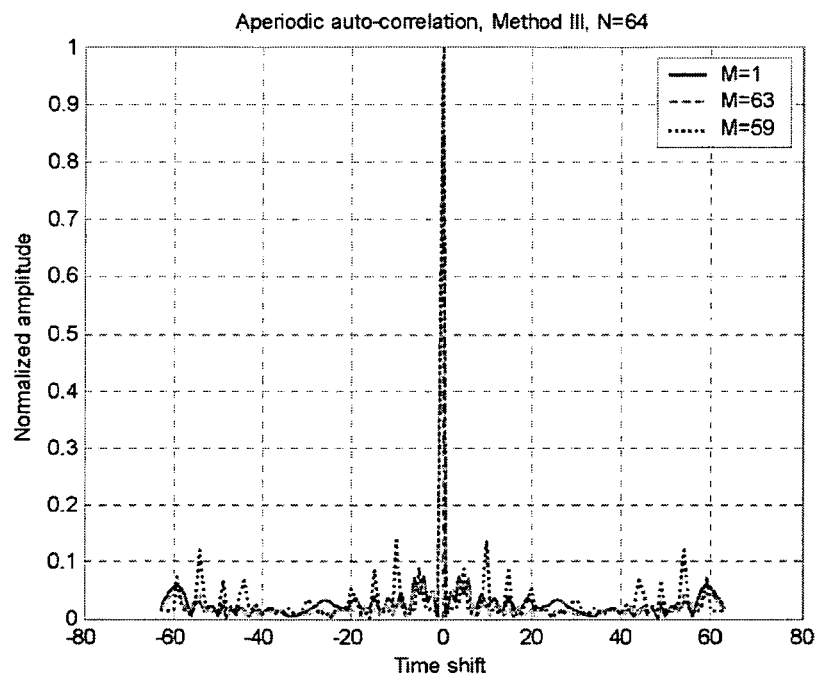
FIGS. 7A and 7B are graphs illustrating aperiodic auto and cross-correlation properties in the case where a set of three sequences of $M=(1,59,63)$ is selected from the sequences generated according to a third method.
Figure 7:
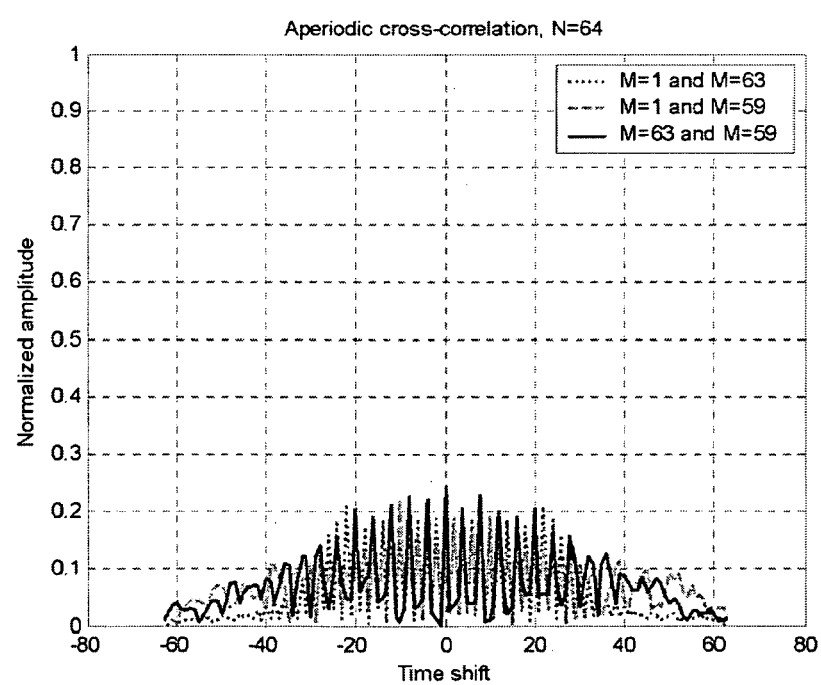

FIGS. 7A and 7B are graphs illustrating aperiodic auto and cross-correlation properties in the case where a set of three sequences of M=(1,59,63) is selected from the sequences generated according to the third method.

It can be seen from FIGS. 7A and 7B that the cross-correlation of the optimal set also exhibits a peak value of about 24.3%.

The same optimal set as described above is selected even when the PAPR or CM requirement is ignored. Thus, it can be seen that, in the case where only the third method is used to generate a set of three sequences, it is also difficult to satisfy all the periodic/aperiodic auto/cross-correlation properties and PAPR or CM properties, similar to the case where only the second method is used to generate a set of three sequences.

<The Case of Generation of Set of Three Sequences Using Fourth Method>

An example in which sequences are generated based on N=64 and L=63 and are then mapped and transmitted in the frequency domain is described below as an example of the case where only the fourth method is used to generate a set of three sequences. In this method, sequences of L=N−1 are generated and are then mapped in the frequency domain in order to generate N-chip sequences in the time domain. For example, when N=64, sequences of L=63 are generated and are then mapped avoiding the DC position. In order to maintain the CAZAC properties of CAZAC sequences in both the time and frequency domains, it is necessary to maintain the continuity of mapping as in the second and third methods. However, this method may cause a problem of deteriorating the CAZAC properties in the time domain since a discontinuous region occurs in the DC section when mapping is performed in the frequency domain. This may cause a failure to perform simultaneous correlation (i.e., may deteriorate the properties of the symmetric pair) when symbol synchronization is performed in the time domain.

Figure 6:
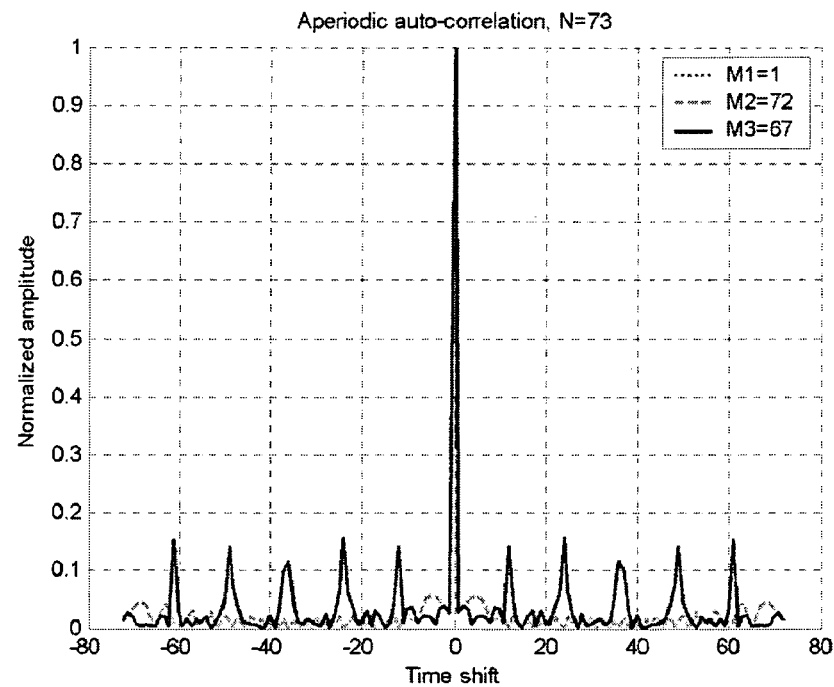
FIGS. 6A and 6B are graphs illustrating aperiodic auto-correlation and cross-correlation properties in the case where a set of three sequences of $M=(1,67,72)$ is selected in the case of $N=73$ when sequences are generated according to the second method.
Figure 6:
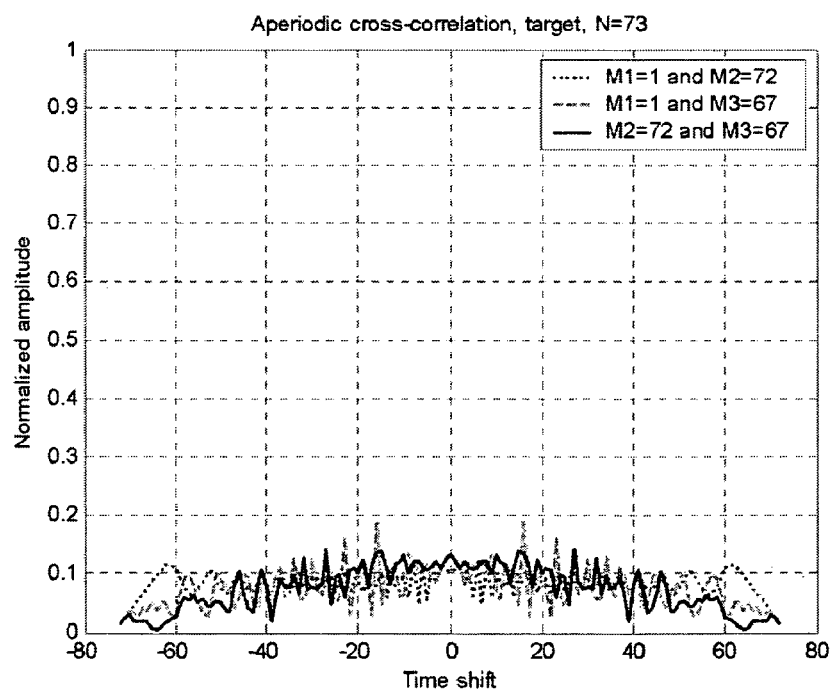

Accordingly, an embodiment of the invention suggests that the discontinuity of the DC portion be eliminated by applying cyclic shift to the frequency domain as in FIG. 6 in order to maintain the continuity of sequences mapped when sequences are generated according to the fourth method.

Figure 8:
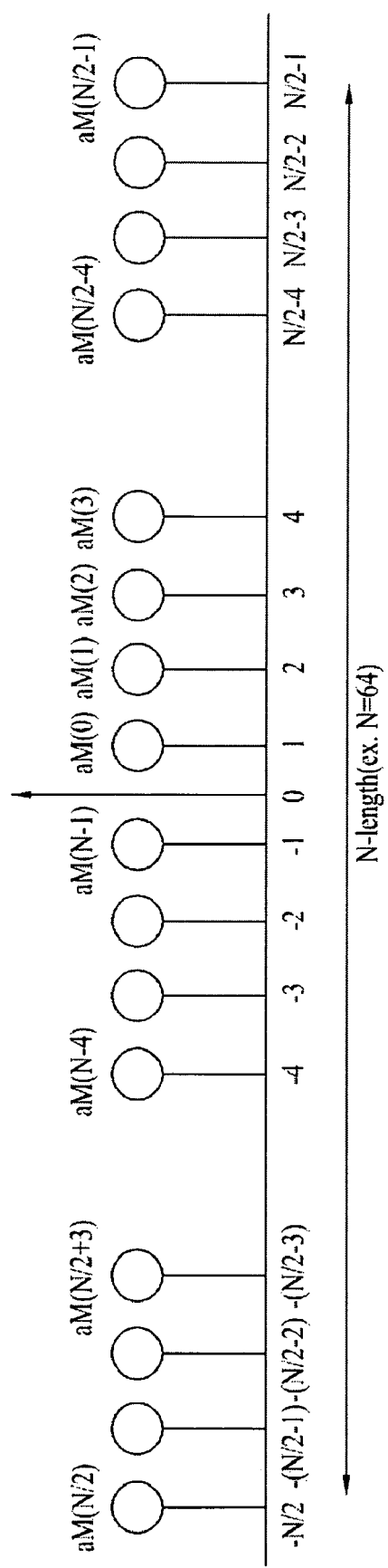
FIG. 8 illustrates a method for generating sequences according to a fourth method so as to maintain the continuity of the sequences using frequency-domain cyclic shift according to an embodiment of the invention.

FIG. 8 illustrates a method for generating sequences according to the fourth method so as to maintain the continuity of the sequences using frequency-domain cyclic shift according to an embodiment of the invention.

Specifically, FIG. 8 shows a method in which sequences are cyclically shifted to the right side by a half of the length of a sequence in order to solve the problem of sequence discontinuity in the DC portion. In the example of FIG. 8, when each sequence has an even length, the discontinuity problem of the DC portion is solved by cyclically shifting each sequence by a half of the length of the sequence. When each sequence has an odd length, the DC portion discontinuity problem can be solved by a method similar to the method illustrated in FIG. 8. For example, the DC portion discontinuity problem can be solved by setting the second of the available subcarriers rather than the first subcarrier as the position at which to start sequence mapping and then mapping sequences to be continuous in a region excluding the DC portion in such a set subcarrier window. In the following description, methods in which sequences are generated so as to be continuous in a region excluding the DC portion using cyclic shift as shown in FIG. 8 will be collectively referred to as a "half-shift method".

The following is a description of the case where a set of three sequences is generated according to the fourth method based on these facts or principles.

Figure 9:
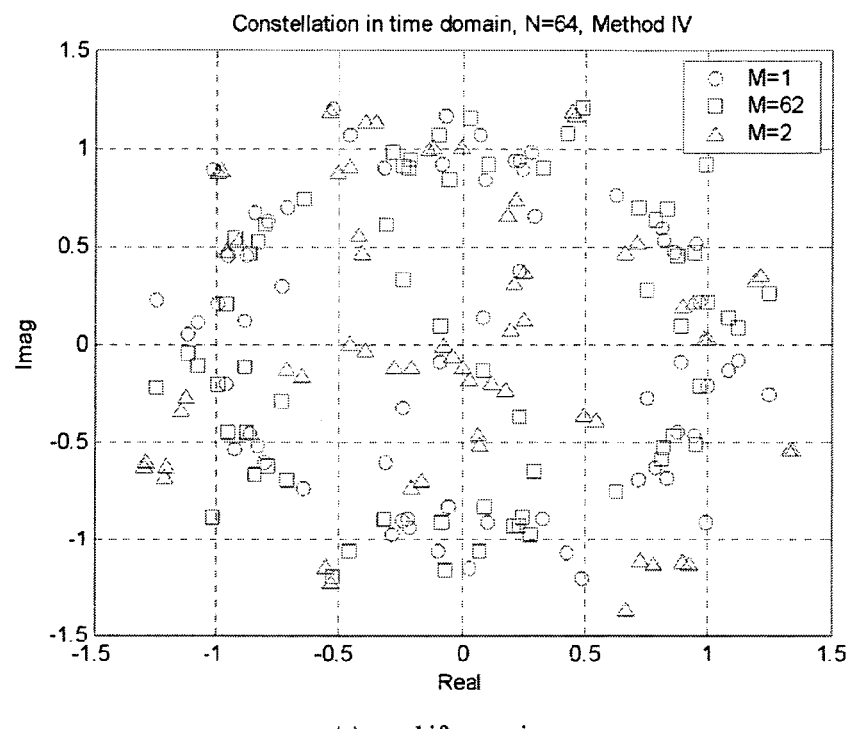
FIGS. 9A and 9B illustrate respective time-domain constellations when the half-shift method according to the embodiment of the invention is not applied and when the half-shift method is applied in the case where a set of three sequences of $M=(1,2,62)$ is selected as a detailed example of the case of generation of a set of three sequences according to the fourth method.
Figure 9:
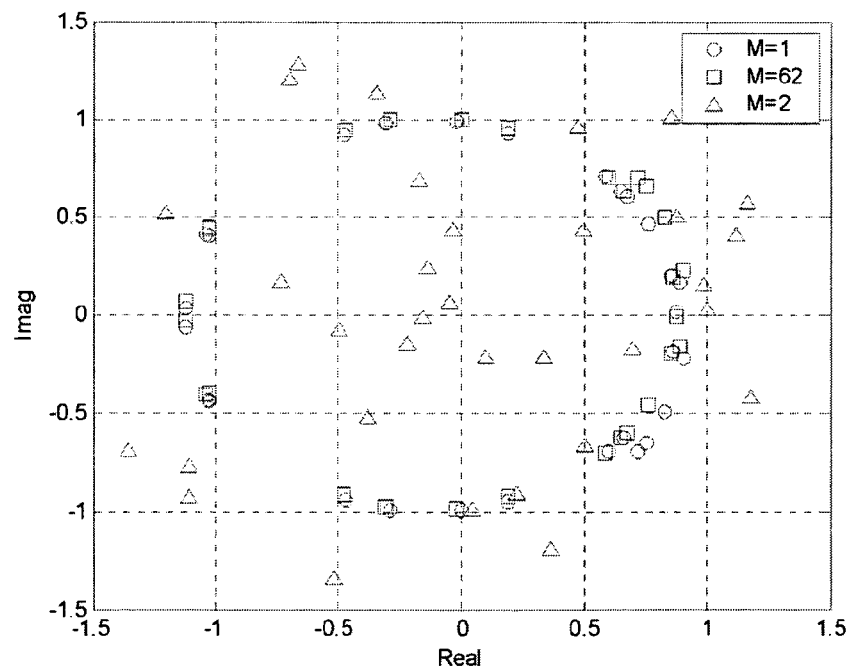

FIGS. 9A and 9B illustrate respective time-domain constellations when the half-shift method according to the embodiment of the invention is not applied and when the half-shift method is applied in the case where a set of three sequences of M=(1,2,62) is selected as a detailed example of the case of generation of a set of three sequences according to the fourth method.

Accordingly, signals generated according to the fourth method cannot maintain the property of uniform magnitudes in the opposite domain (i.e., the time domain) due to the discontinuity described above. This problem can be seen from FIG. 9A.

However, the half-shift method according to the embodiment of the invention as described above can be used as a method for inserting sequences so as to maintain the continuity as much as possible. (For reference, in the case of the second or third method, the same or similar properties are maintained for all cyclic shift combinations since the continuity requirement is satisfied). FIG. 9B illustrates a constellation in the case where a cyclic shift to the right side by a length of 32 among such cyclic shift combinations is applied to insert sequences as shown in FIG. 6. (Of course, the same properties can be achieved in the case where a cyclic shift to the left side by a length of 32 is applied since the case of the cyclic shift to the left side is symmetric to the case of the cyclic shift to the right side).

From this, it can be seen that, in the case where sequences are generated using the fourth method, it is possible to select root sequences which constitute a symmetric pair for simultaneous correlation in the time domain only when sequences are generated using the half-shift method according to the embodiment of the invention. That is, in the example of FIG. 9B, it is possible for the case of M=(1,62) to maintain properties having uniform magnitudes similar to those of the case where sequences are generated using the second or third method. In other words, according to the embodiment of the invention, it is possible to obtain a combination having properties which maintain uniform magnitudes through an appropriate cyclic shift in the frequency domain.

However, in the method for generating a set of three sequences, there is a problem that only two sequences can be selected as sequences which satisfy the half-shift method according to the embodiment of the invention as described above while it is not possible to select the remaining one sequence which satisfies the half-shift method.

When a set of three sequences is selected using only this method, it is also preferable to select two of the three sequences which satisfy the simultaneous correlation requirement, and the remaining one sequence can be selected using another requirement such as aperiodic correlation, PAPR, or CM. However, in the case where a set of three sequences is selected using only the fourth method, there is a problem that it is not possible to generate a set of three sequences which all satisfy the properties which maintain uniform magnitudes in the time domain since up to two sequences can be generated using the above half-shift method according to the embodiment of the invention.

The optimal set of three sequences is M=(1,62,61) for the half shift described above when the PAPR or CM requirement is ignored. In this case, respective non-oversampled PAPRs of the sequences are 1.0298 dB, 1.0298 dB, and 3.6715 dB and respective 4× oversampled CMs thereof are 1.2881 dB, 1.2881 dB, and 4.3712 dB.

Figure 10:
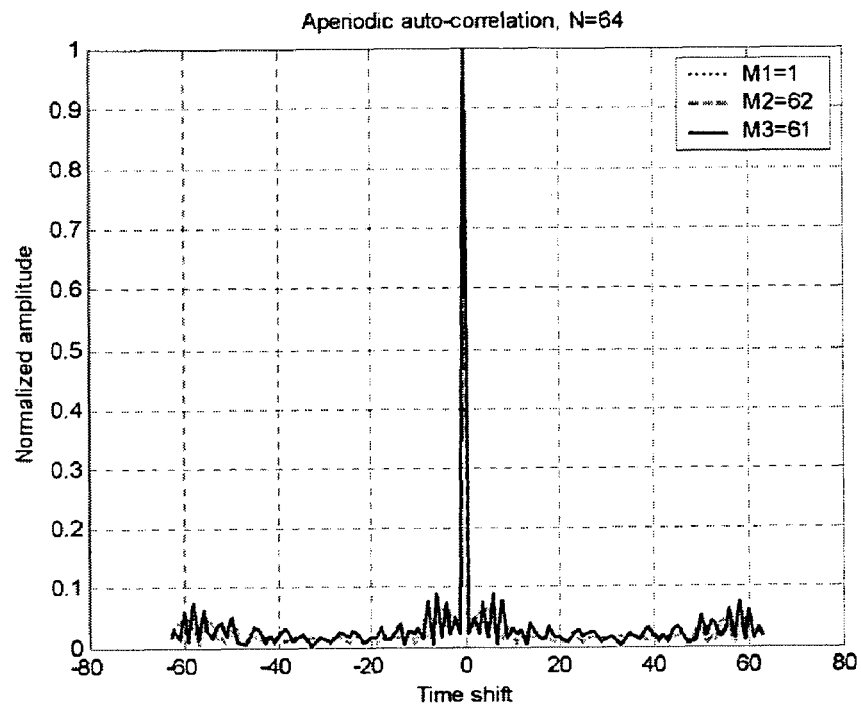
FIGS. 10A and 10B illustrate aperiodic auto and cross-correlation properties when a set of sequences of $M=(1,62, 61)$ are selected as an optimal set in the case where a set of three sequences is generated using the fourth method.
Figure 10:
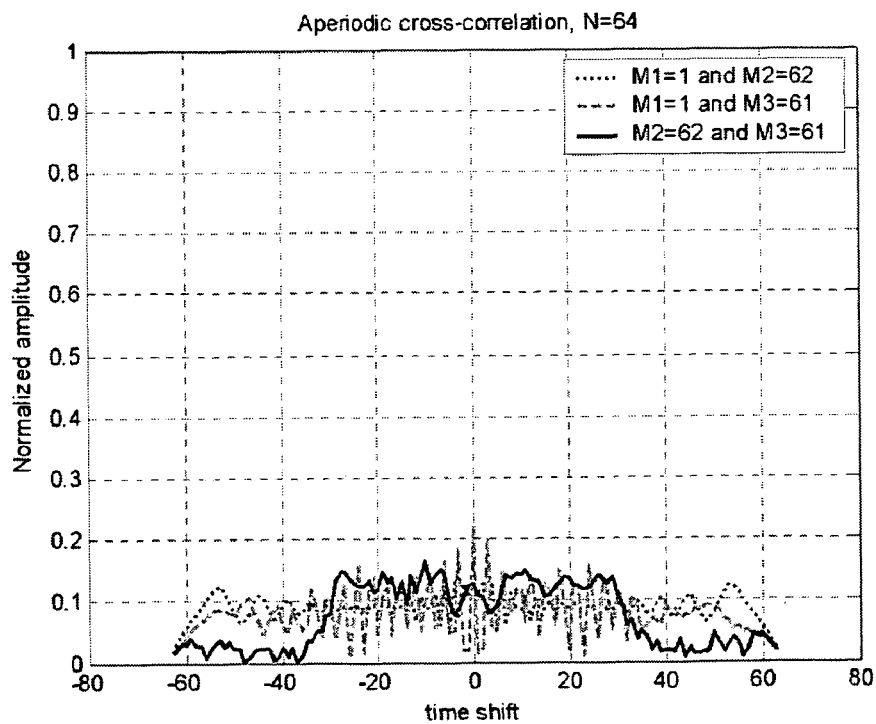

FIGS. 10A and 10B illustrate aperiodic auto and cross-correlation properties when a set of sequences of M=(1, 62, 61) is selected as an optimal set in the case where a set of three sequences is generated using the fourth method.

It can be seen that the cross-correlation also has a peak value of about 22% when such an optimal set is selected.

For reference, in the case where sequences are generated using the second or third method, the DC puncturing causes slight distortion in the above-described desirable properties of each conjugate symmetry pair for signals in the time domain. However, in the case where sequences are generated using the half-shift method according to the embodiment of the invention described above with reference to FIG. 6, there is an advantage in that a perfect pair is achieved without causing distortion such as that of DC puncturing in the symmetry properties in the time domain.

Thus, it can be seen that it is difficult to generate a set of three sequences which satisfies all the periodic/aperiodic auto/cross-correlation properties and PAPR or CM properties in the case where a set of three sequences is generated using only one of the first to fourth methods discussed in the above description. Thus, an embodiment of the invention suggests a method for generating a set of two or more sequences, wherein sets of sequences respectively generated according to at least two of the first to fourth methods described above are defined as first and second types of sequences and at least one sequence is selected from each of the first and second types of sequences to generate a set of two or more sequences which satisfies all the desirable properties required by any sequence-based channel.

Although this embodiment of the invention will be described with reference to a set of three sequences for use in a synchronization channel as a detailed example, the set of three sequences according to the embodiment can be applied not only to the synchronization channel but also to any sequence-based channel such as any control channel for transmitting control information such as RACH, ACK/NACK, or CQI in the same manner and the embodiment of the invention can also be applied to generation of a set of any number of sequences greater than one. Although the following description will be given focusing on ZC sequences, the same method can be applied to any other sequences provided that they maintain the same properties. In addition, although the following description will be given mainly with reference to generation of time-domain sequences of N (=64) chips to provide explanations consistent with the case where a set of three sequences is generated using each of the first to fourth methods described above, the same principles can be applied to other lengths such as 71, 72, 73, and 63.

The requirements described above for selecting an optimal set in the case where a set of three sequences is generated using each of the first to fourth methods are applied when a set of three sequences is generated using each method alone. Relaxed versions of the requirements described above in each of the methods can be applied in the case where a set of two or more sequences is generated using two or more methods according to an embodiment of the invention. Specifically, the requirements described above are selectively applied taking into consideration the respective properties of the requirements in the case where a set of two or more sequences is generated using two or more methods according to the embodiment of the invention.

Reference will now be made to detailed examples of the embodiments of the invention.

First Example

Method of Selecting Two Sequences Using the Fourth Method and One Sequence Using the Second Method This example suggests that a set of three sequences be generated by combining sequences generated using the half shift in the fourth method with a sequence generated using the second method.

When sequences are selected based on the fourth method (specifically, length L=63), it is preferable that either a sequence of M=1 or M=62 be selected in consideration of the PAPR as described above.

When this is taken into consideration, according to this example, two of the three sequences (which correspond to the optimal set of two sequences selected in the fourth method) can be generated by generating sequences based on L=63 and selecting root sequence indices M=(1, 62), cyclically shifting the selected sequences by a length of 32, and mapping the cyclic-shifted sequences to corresponding subcarriers while the remaining one sequence can be generated by generating sequences based on L=63 and selecting a root sequence index M=51 (or 13) according to the second method.

The correlation properties of the set selected in this manner are described below. A detailed description of the periodic correlation properties of the selected set is omitted here since the periodic correlation properties of any set are identical due to the IDFT operation.

Figure 11:
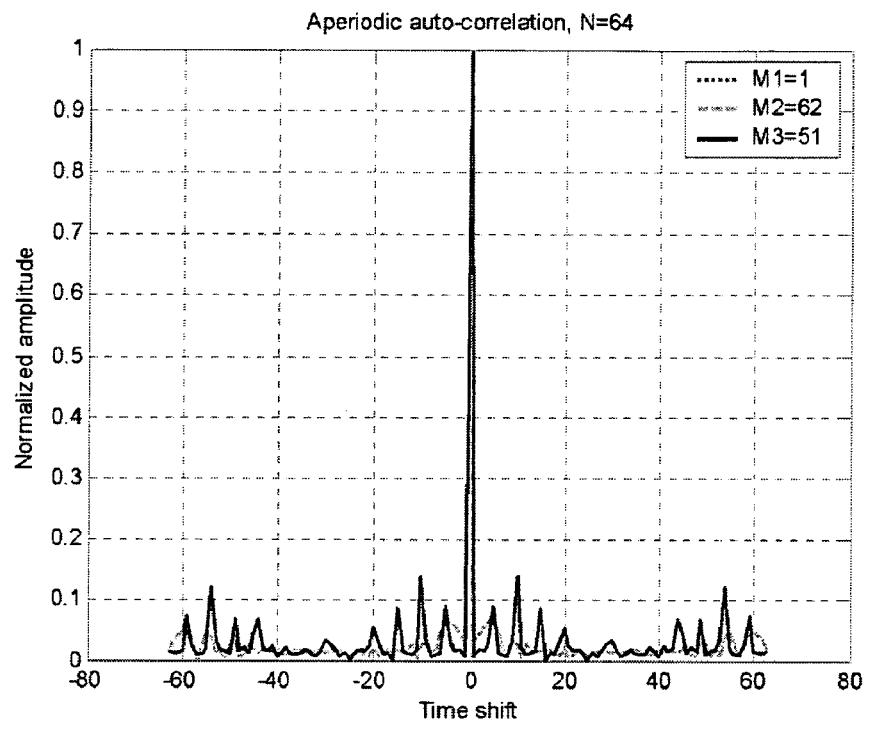
FIGS. 11A and 11B are graphs illustrating respective aperiodic auto and cross-correlation properties of a set of three sequences in the case where two sequences of $M=(1,62)$ are selected from sequences generated according to the fourth method and one sequence of $M=51$ is selected from sequences generated according to the second method according to a first example of the embodiment of the invention.
Figure 11:
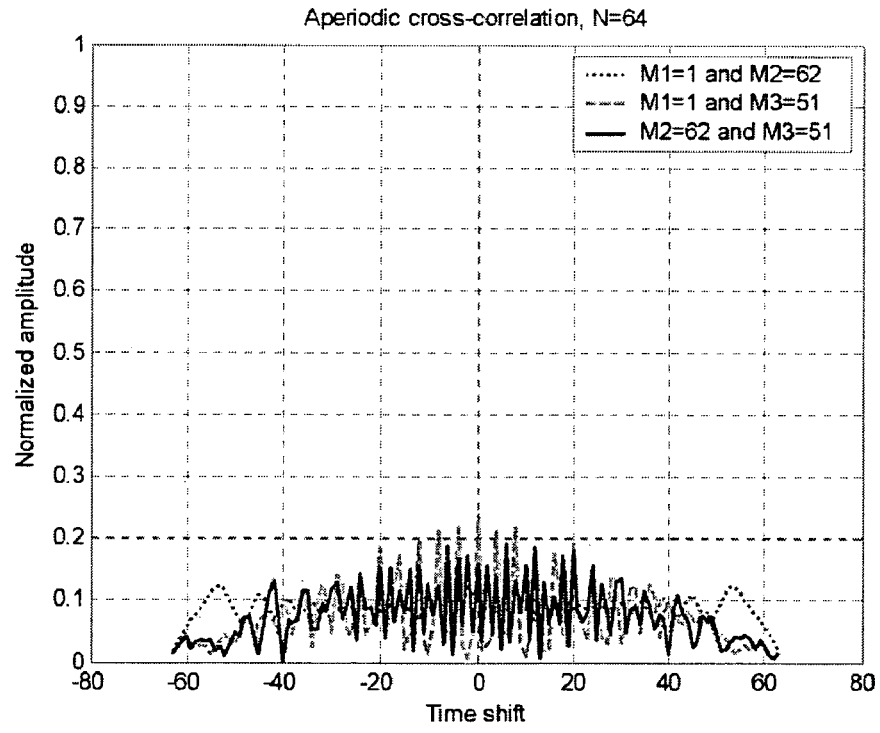

FIGS. 11A and 11B are graphs illustrating respective aperiodic auto and cross-correlation properties of a set of three sequences in the case where two sequences of M=(1,62) are selected from sequences generated according to the fourth method and one sequence of M=51 is selected from sequences generated according to the second method according to the first example of the embodiment of the invention.

From FIGS. 11A and 11B, it can be seen that respective non-oversampled PAPRs of the sequences of M=(1,62) among the sequences generated according to the fourth method and the sequence of M=51 among the sequences generated according to the second method according to this example are 1.0298 dB, 1.0298 dB, and 1.0821 dB and respective 4× oversampled CMs thereof are 1.2881 dB, 1.2881 dB, and 2.521 dB. It can be seen from this that the case of generation of a set of three sequences according to this example exhibits excellent performance for both the CM and at least one cross-correlation pair, compared to the case of generation of a set of three sequences using only the second method. Thus, it can be seen that the case of generation of a set of three sequences according to this example exhibits better properties in terms of overall cross-correlation levels than those of the case of generation of a set of three sequences using only the second method although the case of this example is nearly identical to the case of the second method in terms of the highest peak value.

Although the sequence index of the optimal set selected from sequences generated according to the second method is M=1 or 63, this example selects the sequence index M=51 as the second best from those generated according to the second method based on length 64 in order to avoid the problem of high cross-correlation with the sequences of indices M=1 or 62 that are selected as the optimal set according to the fourth method.

Second Example

Method of Selecting Two Sequences Using the Fourth Method and One Sequence Using the Third Method This example suggests that a set of three sequences be generated by combining sequences generated using the half shift in the fourth method with a sequence generated using the third method.

When three sequences are selected from sequences generated using the fourth method (L=63), it is preferable that either a sequence of M=1 or M=62 be selected in consideration of the PAPR.

The method for generating a sequence of three sequences according to this example can be defined as follows. Two of the three sequences are generated according to the fourth method by applying the half-shift method. Specifically, two of the three sequences are generated by generating sequences based on L=63 and selecting root sequence indices M=(1, 62), and cyclically shifting the selected sequences by a length of 32. The remaining one sequence is generated by generating sequences based on L=64 and selecting a root sequence index M=5 (or 59) according to the third method.

The correlation properties of the set selected in this manner are described below. A detailed description of the periodic correlation properties of the selected set is omitted here since the periodic correlation properties of any set are identical due to the IDFT operation.

Figure 12:
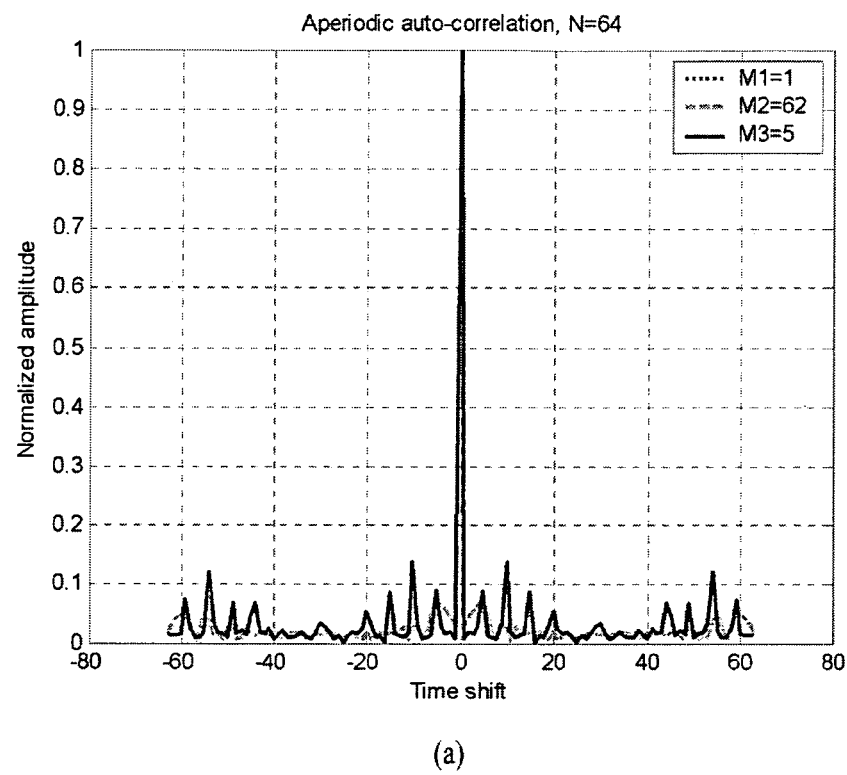
FIGS. 12A and 12B are graphs illustrating respective aperiodic auto and cross-correlation properties of a set of three sequences in the case where two sequences of $M=(1,62)$ are selected from sequences generated according to the fourth method and one sequence of $M=5$ is selected from sequences generated according to the third method according to a second example of the embodiment of the invention.
Figure 12:
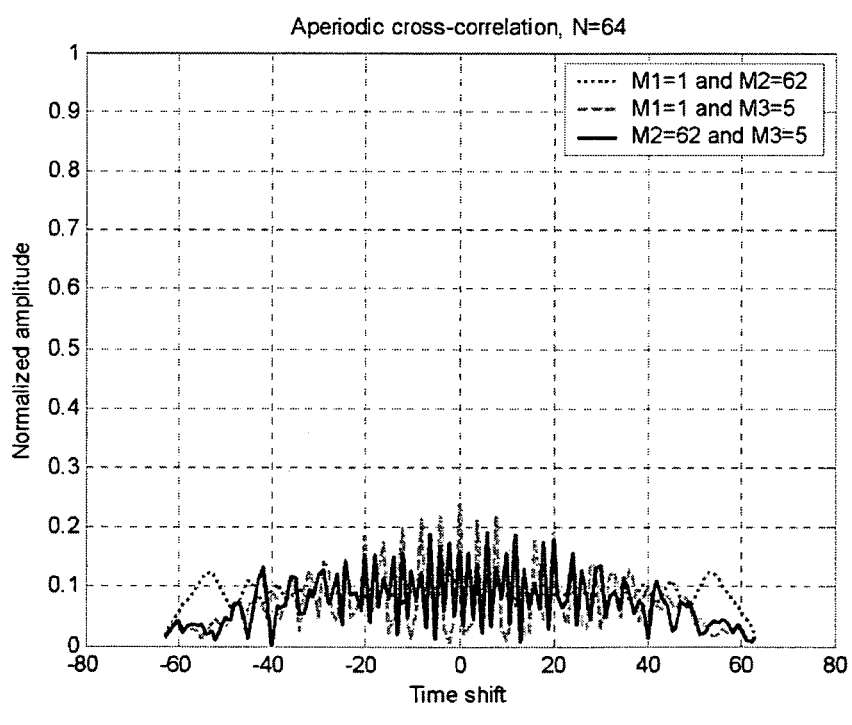

FIGS. 12A and 12B are graphs illustrating respective aperiodic auto and cross-correlation properties of a set of three sequences in the case where two sequences of M=(1,62) are selected from sequences generated according to the fourth method and one sequence of M=5 is selected from sequences generated according to the third method according to the second example of the embodiment of the invention.

From FIGS. 12A and 12B, it can be seen that respective non-oversampled PAPRs of the sequences of M=(1,62) among the sequences generated according to the fourth method and the sequence of M=5 among the sequences generated according to the third method according to this example are 1.0298 dB, 1.0298 dB, and 1.0821 dB and respective 4× oversampled CMs thereof are 1.2881 dB, 1.2881 dB, and 2.521 dB. It can be seen from this that the case of generation of a set of three sequences according to this example exhibits excellent performance for both the CM and at least one cross-correlation pair, compared to the case of generation of a set of three sequences using only the third method. Thus, it can be seen that the case of generation of a set of three sequences according to this example exhibits better properties in terms of overall cross-correlation levels than those of the case of generation of a set of three sequences using only the third method although the case of this example is almost the same as the case of the third method in terms of highest peak value.

Although the sequence index of the optimal set selected from sequences generated according to the third method is M=1 or 63, this example selects the sequence index M=5 as the next best from those generated according to the third method based on length 64 in order to avoid the problem of high cross-correlation with the sequences of indices M=1 or 62 that are selected as the optimal set according to the fourth method.

Third Example

Method of Selecting One Sequence Using the Fourth Method and Two Sequences Using the Second Method This example suggests that a set of three sequences be generated by combining a sequence generated using the half shift in the fourth method with sequences generated using the second method.

As described above, when three sequences are selected from sequences generated using the fourth method (L=63), it is preferable that either a sequence of M=1 or M=62 be selected in consideration of the PAPR.

Specifically, this example suggests that three sequences be generated using two sequences, generated by generating sequences of L=64 according to the second method and selecting root indices M=(13,51), and one sequence, generated by generating sequences of L=63 according to the fourth method and selecting a root index M=1 (or M=62) and cyclically shifting a sequence of the selected root index by a length of 32.

When the PAPR is considered, it is preferable to select the root indices from sequences generated through the second method, avoiding the root indices M=(1,63), since the root index which can be selected from sequences generated through the fourth method is M=1 or 62.

The correlation properties of the set selected in this manner are described below. A detailed description of the periodic correlation properties of the selected set is omitted here since the periodic correlation properties of any set are identical due to the IDFT operation.

Figure 13:
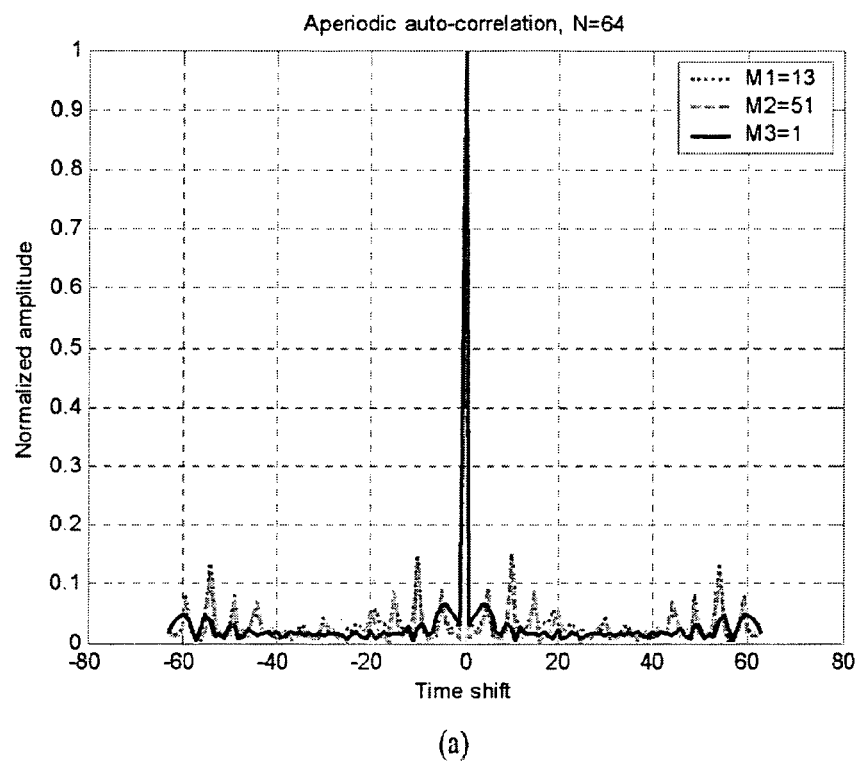
FIGS. 13A and 13B are graphs illustrating respective aperiodic auto and cross-correlation properties of a set of three sequences in the case where two sequences of $M=(13,51)$ are selected from sequences of length 64 generated according to the second method and one sequence of $M=1$ is selected from sequences of length 63 generated according to the fourth method according to a fourth example of the embodiment of the invention.
Figure 13:
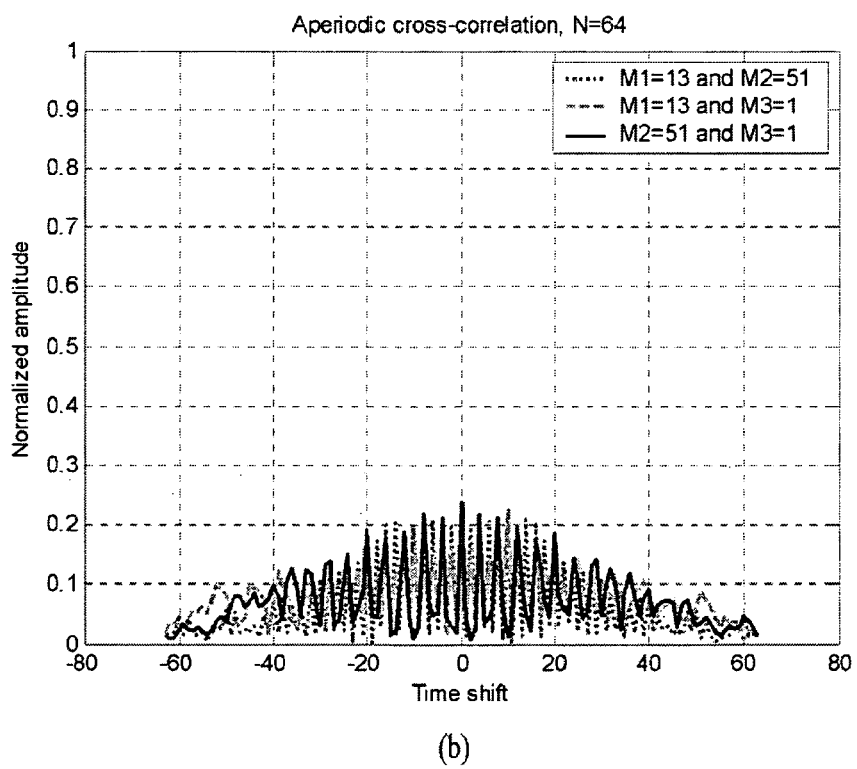

FIGS. 13A and 13B are graphs illustrating respective aperiodic auto and cross-correlation properties of a set of three sequences in the case where two sequences of M=(13,51) are selected from sequences of length 64 generated according to the second method and one sequence of M=1 is selected from sequences of length 63 generated according to the fourth method according to the third example of the embodiment of the invention.

From FIGS. 13A and 13B, it can be seen that respective non-oversampled PAPRs of the sequences of M=(13,51) among the sequences generated according to the second method and the sequence of M=1 among the sequences generated according to the fourth method according to this example are 1.0821 dB, 1.0821 dB, and 1.0298 dB and respective 4× oversampled CMs thereof are 2.521 dB, 2.521 dB, and 1.2881 dB. Here, the cross-correlation also has a peak value of about 23.8%.

Although the sequence of M=1 or M=63 is optimal in the case of the second method, the second optimal sequences are selected since the sequence of M=1 or M=63 may cause the problem of high cross-correlation with the sequence of M=1 (or M=62) of length 63 selected according to the fourth method.

Fourth Example

Method of Selecting One Sequence Using the Fourth Method and Two Sequences Using the Third Method This example suggests that a set of three sequences be generated by combining a sequence generated using the half shift in the fourth method with sequences generated using the third method.

As described above, when three sequences are selected from sequences generated using the fourth method (L=63), it is preferable that either a sequence of M=1 or M=62 be selected in consideration of the PAPR.

Specifically, this example suggests that three sequences be generated using two sequences, generated by generating sequences of L=64 according to the third method and selecting root indices M=(5,59), and one sequence, generated by generating sequences of L=63 according to the fourth method and selecting a root index M=1(or 62) and cyclically shifting a sequence of the selected root index by a length of 32.

When the PAPR is considered, it is preferable to select the root indices from sequences generated through the third method, avoiding the root indices M=(1,63), since the root index which can be selected from sequences generated through the fourth method is M=1 or 62.

A detailed description of the correlation properties of the set selected in this manner is omitted here since the correlation properties are similar to those of the case of the third example.

Similar to the third example, although the sequence of M=1 or M=63 is optimal in the case of the third method, the second optimal sequences are selected since the sequence of M=1 or M=63 may cause the problem of high cross-correlation with the sequence of M=1 (or M=62) of length 63 selected according to the fourth method.

Fifth Example

Method of Selecting One Sequence Using the Fourth Method and Two Sequences Using the Third Method (without Considering PAPR and CM)

The second and third methods can be regarded as being symmetric to each other. Thus, reference will now be made only to the case where three sequences are selected from sequences generated according to the third and fourth methods, among the cases where a set of three sequences is generated using sequences of length 64 and sequences of length 63 without taking into consideration the PAPR or CM.

Specifically, this example suggests that a set of three sequences be selected by generating sequences of length 64 according to the third method and selecting two sequences of M=(1,63) from the generated sequences and generating sequences of length 63 according to the fourth method and selecting one sequence of M=2 (or 61) from the generated sequences.

The correlation properties of the set selected in this manner are described below.

Figure 14:
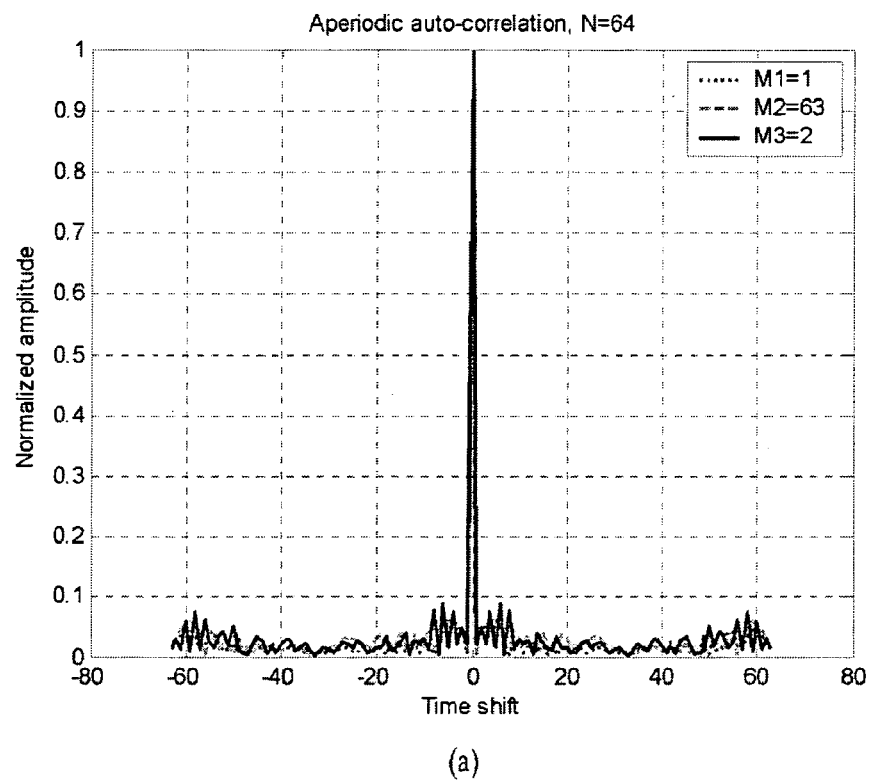
FIGS. 14A and 14B are graphs illustrating respective aperiodic auto and cross-correlation properties of a set of three sequences in the case where two sequences of $M=(1,63)$ are selected from sequences of length 64 generated according to the third method and one sequence of $M=2$ is selected from sequences of length 63 generated according to the fourth method according to a fifth example of the embodiment of the invention.
Figure 14:
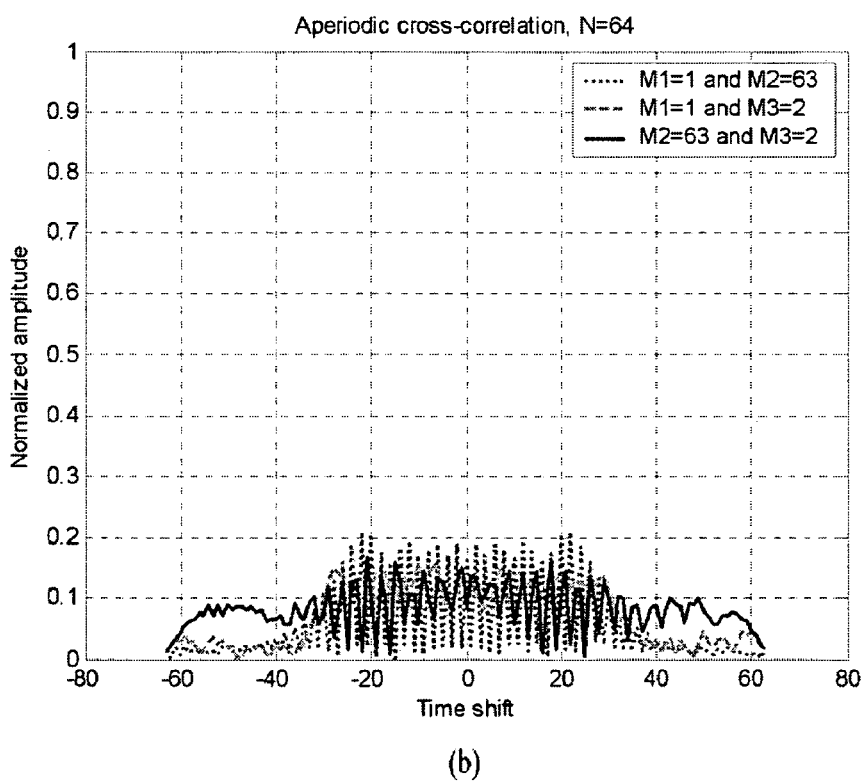

FIGS. 14A and 14B are graphs illustrating respective aperiodic auto and cross-correlation properties of a set of three sequences in the case where two sequences of M=(1,63) are selected from sequences of length 64 generated according to the third method and one sequence of M=2 is selected from sequences of length 63 generated according to the fourth method according to the fifth example of the embodiment of the invention.

From FIGS. 14A and 14B, it can be seen that respective non-oversampled PAPRs of the sequences of M=(1,63) among the sequences generated according to the third method and the sequence of M=2 among the sequences generated according to the fourth method according to this example are 1.0904 dB, 1.0904 dB, and 3.6715 dB and respective 4× oversampled CMs thereof are 1.3713 dB, 1.3713 dB, and 4.3712 dB. Here, the cross-correlation also has a peak value of about 20.8%.

Since it is difficult to generate a set of three sequences, which satisfies all the periodic/aperiodic auto/cross-correlation properties and PAPR or CM properties, using sequences generated through only one of the first to fourth methods, the embodiment of the invention described above suggests a method for generating a set of three sequences, wherein a set of three sequences is generated by selecting at least one sequence from each of at least two sets of sequences respectively generated through at least two of the first to fourth methods.

Specifically, as described above, when each generated sequence has an even length in the case where a set of three sequences is generated by selecting sequences generated using only the second method or where a set of three sequences is generated by selecting sequences generated using only the third method, it is possible to select up to two sequences which satisfy the desirable cross-correlation properties (more specifically, it is possible to select only sequences which constitute a conjugate symmetry pair) and the cross-correlation of any set of three selected sequences will have a high peak value of 24% or higher. On the other hand, in the case where a set of three sequences is generated based on an odd length, it is not possible to select a set of three sequences which maintain the desirable properties described above since any odd-length sequences cannot constitute the conjugate symmetry pair. Also when each generated sequence has a length of 63 in the case where a set of three sequences is generated by selecting sequences generated using only the fourth method, it is not possible to select a set of three sequences which maintain the desirable properties described above since, according to the half-shift method of the embodiment of the invention, it is possible to generate up to two sequences (i.e., through left and right half shifts).

Accordingly, the embodiment of the invention can select a set of three sequences, which satisfies the correlation and PAPR (or CM) properties, by selecting one or more sequences using each of two or more methods (specifically, from each of two types of sequences having different lengths). This method can select a set of three sequences with better performance without increasing complexity.

In the above embodiment of the invention, we have discussed a method for generating a set of two or more sequences using two or more sequence generation methods (specifically, from two or more types of sequences having different lengths). Reference will now be made to a method for generating a set of two or more sequences according to another embodiment of the invention, wherein a set of two or more sequences is generated using a specific type of sequences and another type of sequences that are produced by modulating the specific type of sequences using a different type of sequences.

II. Second Embodiment

Method for Generating a Set of Two or More Sequences Using Sequences Generated Through Modulation Using Different Type of Sequences The ZC sequences described above are the most prominent among those used in the current 3GPP LTE. However, due to the time-frequency duality of ZC sequences, performing synchronization in an environment having a frequency offset may result in loss of timing in the time domain.

The time-frequency duality is a phenomenon in which a sequence shifted in one domain is also shifted in the other domain.

For example, in the case where timing synchronization is performed in the time domain in an environment having a frequency offset in a synchronization channel, partial correlation should be performed due to the frequency offset. The same is true in the case where frequency synchronization is performed in the frequency domain in an environment having a time offset.

Although CAZAC-type sequences such as ZC sequences have ideal correlation properties as described above with reference to Mathematical Expressions 3 and 4, the ideal correlation properties are deteriorated to some extent when partial correlation is performed due to the frequency offset as described above.

When a frequency offset is present, an ambiguous peak occurs in addition to a desired peak corresponding to the original timing.

Figure 15:
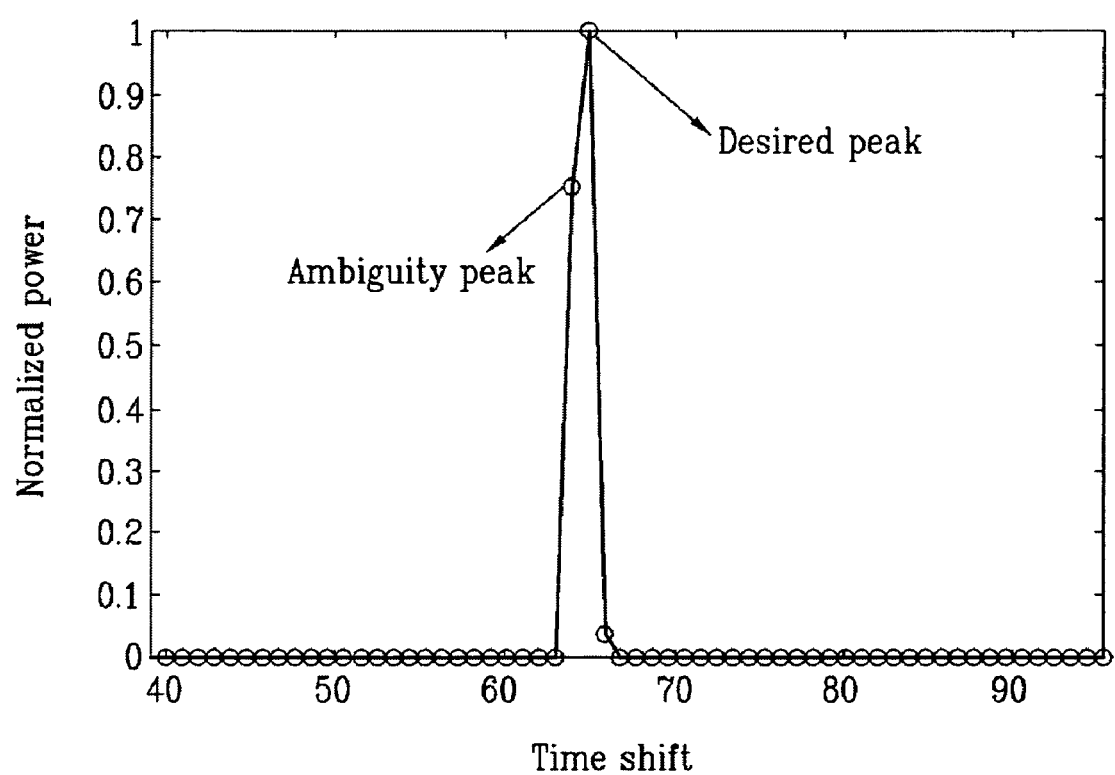
FIG. 15 is a graph illustrating an example in which an ambiguous peak occurs when timing synchronization is performed in an environment having a frequency offset of 5 ppm.

FIG. 15 is a graph illustrating an example in which an ambiguous peak occurs when timing synchronization is performed in an environment having a frequency offset of 5 ppm.

Specifically, FIG. 15 shows an example in which an ambiguous peak occurs at a position of about 75% when timing synchronization is performed. If the timing is synchronized with the desired peak in FIG. 15, the synchronization does not affect frequency synchronization which is the next process. However, if the timing is synchronized with the ambiguous peak, proper frequency synchronization cannot be performed due to the time-frequency duality described above. That is, when timing synchronization is performed, the estimation performance of frequency synchronization depends on how much lower the level of the second peak is than the level of the desired peak.

Thus, an embodiment of the invention suggests that not only ZC sequences but also sequences produced by modulating ZC sequences using a different type of sequences be used to generate a set of two or more sequences. Although it is preferable that Hadamard sequences be used to modulate ZC sequences, any other random sequences may also be used to modulate ZC sequences.

A description will now be given of a detailed example of this method where Hadamard sequences are used to modulate ZC sequences. Although the following description will be given mainly with reference to a method in which sequences are generated in the time domain, more specifically a method in which sequences are generated in the time domain and are then transformed into frequency-domain signals through DFT and DC puncturing is performed on such transformed sequences, the invention may also provide a method in which sequences are generated in the frequency domain and sequences are directly mapped to corresponding subcarriers. The modulation using Hadamard sequences may be performed in the time or frequency domain.

ZC sequences are generated in the time domain in the detailed example of this embodiment. ZC sequences generated in the time domain can be represented by the above Mathematical Expression 1. Although this example will be described with reference to the case of N=64, the same method, in which two or more sequences are modulated for use, can be applied to other cases. This example will be described with reference to a specific case where M=1.

A Hadamard sequence is selected as a sequence for use in modulation. In this example, the following sequence which corresponds to a fifth column is selected from Hadamard sequences of length 64.

H=[1 1 1 1 −1 −1 −1 −1 1 1 1 1 −1 −1 −1 −1 1 1 1 1 −1 −1 −1 −1 1 1 1 1 −1 −1 −1 −1 1 1 1 1 −1 −1 −1 −1 1 1 1 1 −1 −1 −1 −1 1 1 1 1 −1 −1 −1 −1 1 1 1 1 −1 −1 −1 −1]

Accordingly, the Hadamard-modulated ZC sequence $a(n) \otimes H(n)$ can be represented as follows. Here, $\otimes$ is an operator that performs element-by-element multiplication.

T=[1 0.9988−0.049068i 0.98079−0.19509i 0.90399−0.42756i          −0.70711+0.70711i −0.33689+0.94154i 0.19509+0.98079i 0.74095+0.67156i −1 −1.2246e-016i −0.67156+0.74095i 0.19509+0.98079i 0.94154+0.33689i −0.70711+0.70711i 0.42756+0.90399i 0.98079−0.19509i −0.049068−0.9988i 1 +4.8986e-016i −0.049068−0.9988i −0.98079+0.19509i 0.42756+0.90399i −0.70711+0.70711i 0.94154+0.33689i −0.19509−0.98079i −0.67156+0.74095i −1 −1.1022e-015i 0.74095+0.67156i −0.19509−0.98079i −0.33689+0.94154i     −0.70711+0.70711i     0.90399 −0.42756i    −0.98079+0.19509i    0.9988−0.049068i   1 +1.9594e-015i −0.9988+0.049068i 0.98079−0.19509i −0.90399+0.42756i          −0.70711+0.70711i 0.33689−0.94154i 0.19509+0.98079i −0.74095−0.67156i −1 +4.911e-016i 0.67156−0.74095i 0.19509+0.98079i −0.94154−0.33689i    −0.70711+0.70711i    −0.42756 −0.90399i 0.98079−0.19509i 0.049068+0.9988i 1 +4.4087e-015i 0.049068+0.9988i −0.98079+0.19509i −0.42756−0.90399i    −0.70711+0.70711i    −0.94154 −0.33689i   −0.19509−0.98079i   0.67156−0.74095i   −1 −1.6659e-014i −0.74095−0.67156i −0.19509−0.98079i 0.33689−0.94154i    −0.70711+0.70711i    −0.90399 +0.42756i −0.98079+0.19509i −0.9988+0.049068i]

After the Hadamard-modulated ZC sequence is generated in this manner, transformation into the frequency domain using DFT, DC puncturing, and transformation into time-domain signals may be performed in the same manner as in the conventional sequence generation method.

Figure 16:
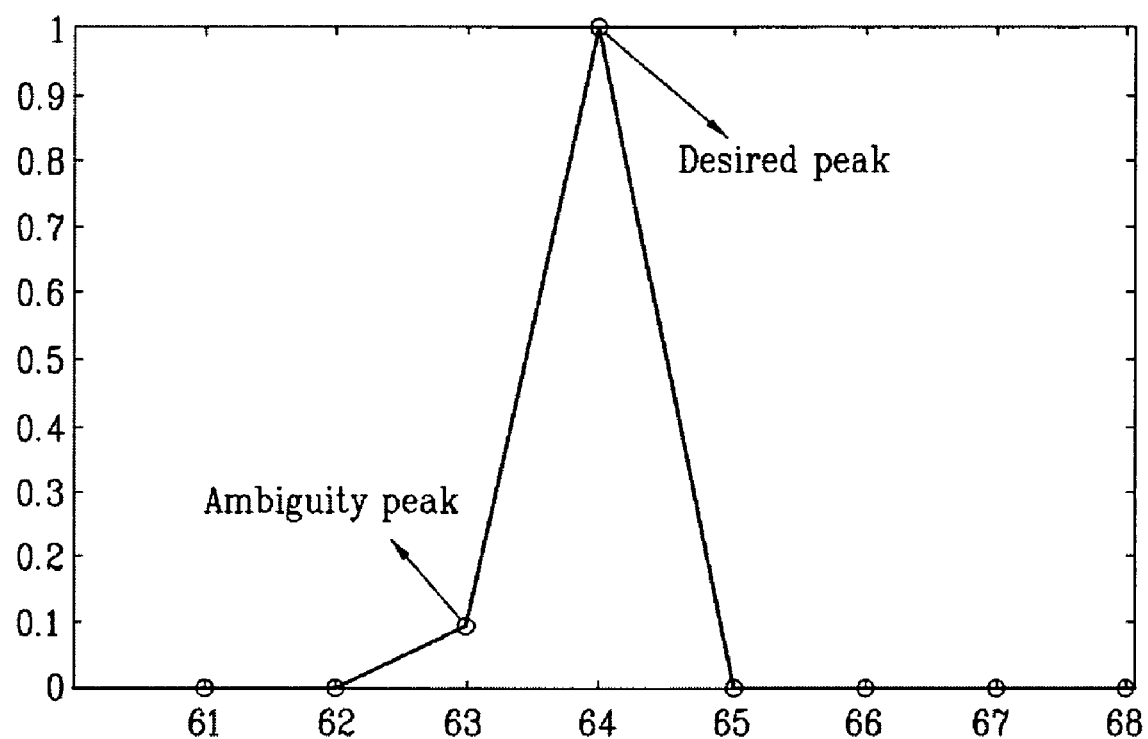
FIG. 16 is a graph illustrating a profile when timing synchronization is performed on a Hadamard-modulated ZC sequence generated according to the embodiment of the invention in an environment having a frequency offset of 5 ppm.

FIG. 16 is a graph illustrating a profile when timing synchronization is performed on a Hadamard-modulated ZC sequence generated according to the embodiment of the invention in an environment having a frequency offset of 5 ppm.

When FIG. 16 is compared with FIG. 15, it can be seen that the level of the ambiguous peak is significantly reduced. The sequence generated according to this embodiment also maintains the same time/frequency flatness properties as those due to the conventional CAZAC properties, while no influence is exerted on cross-correlation properties between sequences (specifically, an ambiguous peak occurs below 10%).

In the case where a requirement that the opposite domain be flat is added when a Hadamard sequence is selected, a Hadamard sequence to be combined with the ZC sequence can be selected only from Hadamard sequences which correspond to the 1st to 16th columns when N=64. In the above example, the fifth column is selected when N=64.

As is apparent from the above description, this embodiment can be summarized as follows. Walsh-Hadamard sequences are used to overcome the time/frequency ambiguity problem that may occur with CAZAC sequences such as ZC or Frank sequences. The use of Walsh-Hadamard sequences solves the ambiguity problem due to the frequency offset. Especially, in order to maintain the flat properties in both the time and frequency domains, it is preferable to use only part of the Hadamard sequences.

The following is an example of a set of three sequences which can be selected using sequences generated according to the above example which uses Hadamard-modulated ZC sequences in the manner described above. In this example, sequences are generated in the time domain.

First Sequence: This sequence is generated by modulating a ZC sequence corresponding to M=1 using a Hadamard sequence corresponding to an 11th Hadamard column.

Second Sequence: This sequence is generated by modulating a ZC sequence corresponding to M=63 using a Hadamard sequence corresponding to the 11th Hadamard column.

Third Sequence: This sequence is generated by modulating a ZC sequence corresponding to M=51 using a Hadamard sequence corresponding to an 8th Hadamard column.

Here, Hadamard indices are 0-63.

According to this embodiment of the invention described above, it is possible to generate and use sequences which are less sensitive to frequency offset than pure ZC sequences.

Figure 2:
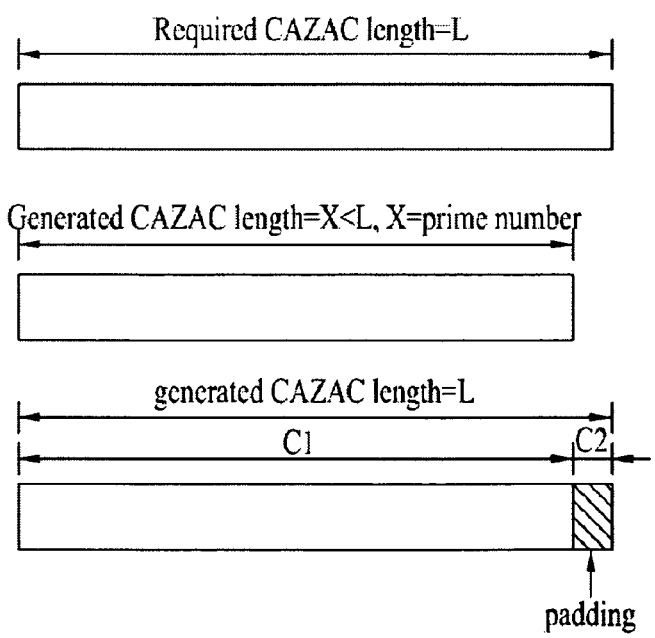
FIG. 2 illustrates a method of generating sequences according to a padded sequence generation method.
Figure 3:
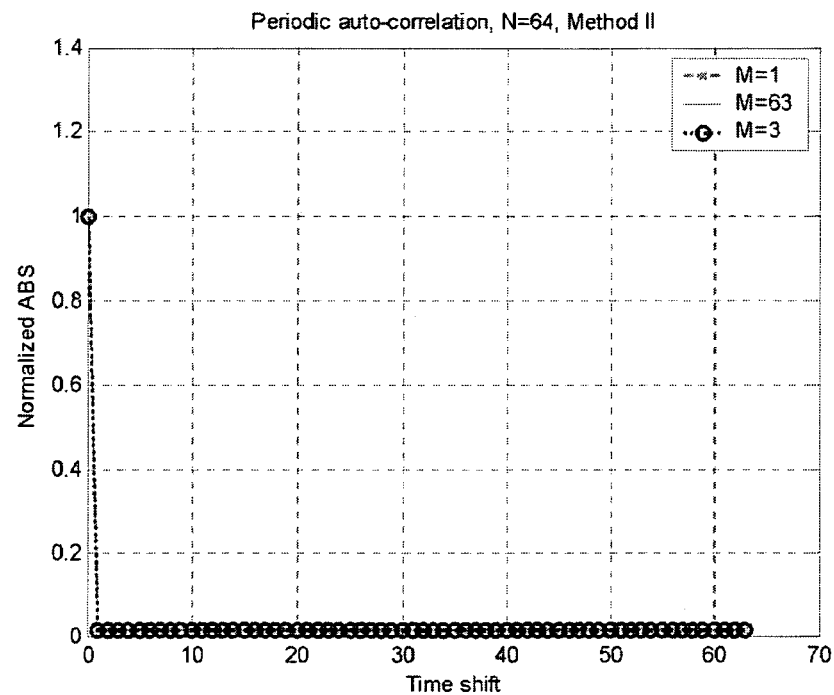
FIGS. 3A and 3B and 4A and 4B are graphs illustrating auto-correlation properties and cross-correlation properties in the case where three sequences having ZC sequence indices of $M=(1, 3, 63)$ are selected as a detailed example of the generation of a set of three ZC sequences based on $N=64$ and $L=64$ according to a second method.
Figure 3:
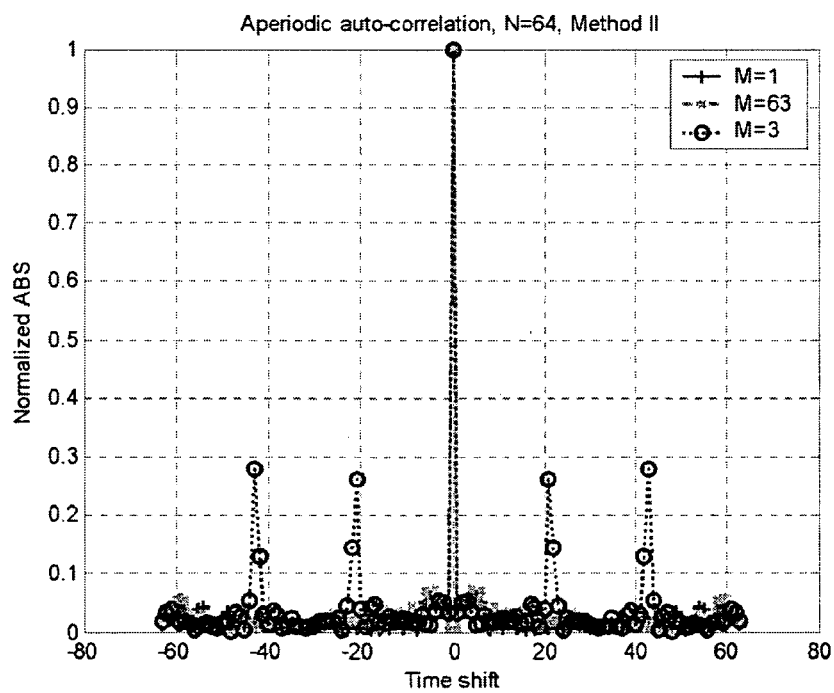

Although ZC sequences having a length 64 are generated and used without alteration in the above example, this embodiment of the invention may provide, as another example, any combination of a variety of methods such as a method in which ZC sequences having a length greater than 64 are generated and are then truncated using the truncated sequence generation method described with reference to FIG. 1 and a method in which ZC sequences having a length less than 64 are generated and are then extended using the extension method described with reference to FIG. 2.

It can be seen that the Hadamard sequence used in the above example includes a repeated Hadamard sequence of length 8 (specifically, a 8-row sequence [1 1 1 1 −1 −1 −1 −1] in the 5th Hadamard column). Based on this principle, another embodiment of the invention suggests a method that uses a repeated Hadamard sequence having a small length as a desired Hadamard sequence.

For example, when there is a need to modulate a ZC sequence of length 72 using a half shift, a binary sequence of length 72 can be generated by repeating a Hadamard sequence of length 8 nine times since there is no Hadamard sequence of length 72. A Hadamard-modulated ZC sequence according to this embodiment can be generated by modulating the ZC sequence of length 72 using the generated binary sequence of length 8×9 according to the element-by-element method.

Although the small-length Hadamard sequence may be simply repeated to generate a sequence such as 1 1 1 1 −1 −1 −1 −1 1 1 1 1 −1 −1 −1 −1, the small-length Hadamard sequence may be repeated while the sign is reversed at the repetition to generate a sequence such as 1 1 1 1 −1 −1 −1 −1 −1 −1 −1 −1 1 1 1 1.

For better understanding, reference will now be made to a ZC sequence of length 12 as a simplest example.

Let us assume that the ZC sequence of length 12 is represented as follows.

[a(0) a(1) a(2) a(3) a(4) a(5) a(6) a(7) a(8) a(9) a(10) a(11)]

On the other hand, a Hadamard sequence of length 4 can be represented as follows.

[h(0) h(1) h(2) h(3)]

A sequence produced through modulation using these sequences according to this embodiment can be represented as follows.

[a(0)h(0) a(1)h(1) a(2)h(2) a(3)h(3) a(4)h(0) a(5)h(1) a(6)h(2) a(7)h(3) a(8)h(0) a(9)h(1) a(10)h(2) a(11)h(3)]

Instead of repeating the Hadamard sequence of length 4 simply in this manner, the Hadamard sequence of length 4 may be repeated while the sign is reversed at each repetition to generate a sequence as follows.

[a(0)h(0) a(1)h(1) a(2)h(2) a(3)h(3) a(4)(−h(0)) a(5)(−h(1)) a(6)(−h(2)) a(7)(−h(3)) a(8)(−h(0)) a(9)(−h(1)) a(10)(−h(2)) a(11)(−h(3))]

Although the above example has been illustrated only for the method where sequences are generated in the time domain, the same method can be applied in the case where sequences are generated and used in the frequency domain. That is, the same sequence generation method as described above is applied in this case with the only difference being that generated sequences are mapped in the frequency domain.

The following sequence generation method can also be applied.

For example, in the case where sequences having a length of 32 (a total length of 64) are symmetrically mapped, a sequence of length 64 is generated by symmetrically connecting sequences of length 32 and is then modulated by mapping the sequence of length 64 to another sequence of length 64. Of course, this method can be used in combination with the above method which uses a repeated short Hadamard sequence.

For better understanding, reference will now be made to the following example.

A ZC sequence of length 8 generated by symmetrically connecting ZC sequences of length 4 can be represented as follows.

[a(0) a(1) a(2) a(3) a(3) a(2) a(1) a(0)]

Here, a sequence produced through modulation using a Hadamard sequence of length 4 can be represented as follows.

[a(0)h(0) a(1)h(1) a(2)h(2) a(3)h(3) a(3)h(3) a(2)h(2) a(1)h(1) a(0)h(0)]

It can be seen from this example that Hadamard sequences used for modulation of the ZC sequence are also symmetrically connected.

However, since a half shift generally must have a length equal to a power of 2 (or n/12 or n/20 has a length equal to a power of 2), the Hadamard-modulated ZC sequence must also have a length equal to a power of 2. This may cause the same problem as the above-described problem which may occur when a set of three sequences is generated using only sequences having an even length in the case where a set of three sequences is generated using only one of the first to fourth methods. The same problem may also occur in the above example in which a set of three sequences is generated using a Hadamard-modulated ZC sequence. That is, if a set of three sequences is generated by selecting three sequences from sequences having an even length, it may be difficult to achieve optimization in the cross-correlation aspect since the cross-correlation exhibits a peak value of 24% or higher.

Thus, an embodiment of the invention suggests that a set of two or more sequences be generated not only using the Hadamard-modulated ZC sequences as described above but also using sequences selected from ZC sequences.

The following is a detailed description of this method in the case where a set of three sequences is generated as an example of the set of two or more sequences. A set of three sequences can be generated by selecting two sequences from Hadamard-modulated ZC sequences and selecting one sequence from ZC sequences. Alternatively, a set of three sequences can be generated by selecting one sequence from Hadamard-modulated ZC sequences and selecting two sequences from ZC sequences.

In another example where a set of three sequences is generated, a set of three sequences can be generated by selecting one sequence from random sequences (or binary sequences) and selecting two sequences from ZC sequences. In this example, it is preferable that the two selected ZC sequences have indices M of 1 and N−1 when the length of a ZC sequence is N.

In another example where a set of three sequences is generated, a set of three sequences can be generated by selecting two sequences from random sequences (or binary sequences) and selecting one sequence from ZC sequences.

The selection of one or more sequences from each of two types of sequences may be made taking into consideration the periodic/aperiodic auto/cross-correlation properties and PAPR or CM properties.

In the case where a set of three sequences is generated according to the above embodiments of the invention, a set of three sequences is constructed by selecting one or more sequences from each of sets of sequences which are based on different methods and/or different lengths. In a preferred embodiment of the invention, this method can be used in combination with a method in which sequences are generated based on a length less than a length to be applied and the generated sequences are then extended by a length corresponding to the difference between the length of the generated sequences and the length to be applied through zero insertion or cyclic copy. The above method may also be used in combination with a method in which sequences are generated based on a length greater than a length to be applied and the generated sequences are then truncated by a length corresponding to the difference between the length of the generated sequences and the length to be applied.

The first and second embodiments of the invention described above may be used in conjunction. For example, in the case where a set of two or more sequences is generated by selecting one or more sequences from each of first and second types of sequences that are generated based on two or more different lengths, one of the sequences may be a sequence modulated using another sequence.

In another embodiment of the invention, a set of two or more sequences can be generated using two or more different types of sequences to achieve a set of two or more sequences having more excellent correlation and PAPR (CM) properties. For example, a set of two or more sequences can be generated by selecting one of the two or more sequences from the ZC sequences and selecting one or more other sequences from any other type of sequences such as PN sequences.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

According to the embodiments of the invention, it is possible to generate a set of two or more sequences which has good correlation and PAPR (or CM) properties and also can reduce the amount of calculation at a receiver.

What is claimed is:

1. A method for generating a set of at least two sequences, the method comprising:
   selecting at least one sequence from a first type of sequences and at least one sequence from a second type of sequences, wherein:
      the first type of sequences are generated based on a first length corresponding to available subcarriers including a DC subcarrier and by puncturing a component corresponding to the DC subcarrier,
      the second type of sequences are generated based on a second length corresponding to the available subcarriers excluding the DC subcarrier, and
      none of the first type of sequences and the second type of sequences is allocated to the DC subcarrier; and
   generating the set of at least two sequences using the selected sequences.

2. The method according to claim 1, wherein the first type of sequences are generated from a frequency-domain Zadoff-Chu sequence.

3. The method according to claim 1, wherein the first length is 63, and wherein the second length is 62.

4. The method according to claim 1, wherein the first type of sequences and the second type of sequences are used for at least one among synchronization signals, reference signals, acknowledgment signals, control channels, or random access channels.

* * * * *